US009354384B2

(12) United States Patent
Kasai

(10) Patent No.: US 9,354,384 B2
(45) Date of Patent: May 31, 2016

(54) DISPLAY DEVICE COMPRISING A HEAT DISSIPATION MEMBER HAVING A STAND-UP PORTION PROJECTING TOWARD A DISPLAY PANEL AND TELEVISION DEVICE

(71) Applicant: Sharp Kabushiki Kaisha, Osaka-shi, Osaka (JP)

(72) Inventor: Nobuhiro Kasai, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 14/401,590

(22) PCT Filed: Jun. 12, 2013

(86) PCT No.: PCT/JP2013/066193
§ 371 (c)(1),
(2) Date: Nov. 17, 2014

(87) PCT Pub. No.: WO2013/191051
PCT Pub. Date: Dec. 27, 2013

(65) Prior Publication Data
US 2015/0098026 A1 Apr. 9, 2015

(30) Foreign Application Priority Data

Jun. 19, 2012 (JP) ................. 2012-137791

(51) Int. Cl.
*G02F 1/1335* (2006.01)
*F21V 8/00* (2006.01)
(Continued)

(52) U.S. Cl.
CPC ............ *G02B 6/0091* (2013.01); *G02B 6/0085* (2013.01); *G02F 1/1336* (2013.01);
(Continued)

(58) Field of Classification Search
CPC ................ G02B 6/0091; G02F 1/1336; G02F 2001/13332; H04N 5/645
USPC .......................................... 349/65
See application file for complete search history.

(56) References Cited

U.S. PATENT DOCUMENTS 7,771,108 B2  8/2010  Iwasaki
8,780,296 B2  7/2014  Kim et al.
(Continued)

FOREIGN PATENT DOCUMENTS

CN   102102832 A    6/2011
CN   102374456 A    3/2012
(Continued)

OTHER PUBLICATIONS

Official Communication issued in International Patent Application No. PCT/JP2013/066193, mailed on Jul. 16, 2013.

*Primary Examiner* — Paul Lee
(74) *Attorney, Agent, or Firm* — Keating & Bennett, LLP

(57) ABSTRACT

A liquid crystal display device 10 includes an LED 17, a liquid crystal panel 11, a light guide plate 16 including a light exit surface 16a, an opposing surface 16c, and a light entrance surface 16b, a chassis 14 having a bottom plate 14a, a frame 13, an LED board 18, a heat dissipation member 19 having heat dissipation properties, and a fixing screw 40. The heat dissipation member 19 includes a contact portion 19c being in contact with an end portion of the opposing surface 16c on a light entrance surface 16b side, a bottom portion 19b arranged on and along the bottom plate 14a and a stand-up portion 19a projecting from the bottom portion 19b toward the liquid crystal panel 11. The LED board 18 is mounted on a surface of the stand-up portion 19a. The fixing screw 40 is passed through the contact portion 19c and a tip portion thereof is fixed in the opposing surface 16c such that the stand-up portion 19a and the LED board 18 are fixed relative to the light guide plate 16.

19 Claims, 12 Drawing Sheets

(51) Int. Cl.
*G02F 1/1333* (2006.01)
*H04N 5/645* (2006.01)

(52) U.S. Cl.
CPC .... *G02F1/133308* (2013.01); *G02F 1/133382* (2013.01); *H04N 5/645* (2013.01); *G02B 6/0068* (2013.01); *G02F 1/133615* (2013.01); *G02F 2001/13332* (2013.01); *G02F 2001/133314* (2013.01)

(56) References Cited

U.S. PATENT DOCUMENTS

2009/0103328 A1* 4/2009 Iwasaki ............ G02B 6/0041
362/617

2011/0037920 A1  2/2011 Kim et al.
2011/0149602 A1  6/2011 Lee et al.
2012/0014135 A1* 1/2012 Kim .............. G02F 1/133615
362/623

FOREIGN PATENT DOCUMENTS

| JP | 2007-080564 A | 3/2007 |
| JP | 2009-117349 A | 5/2009 |
| JP | 2011-040388 A | 2/2011 |
| JP | 2011-134715 A | 7/2011 |

* cited by examiner

DISPLAY DEVICE COMPRISING A HEAT DISSIPATION MEMBER HAVING A STAND-UP PORTION PROJECTING TOWARD A DISPLAY PANEL AND TELEVISION DEVICE

TECHNICAL FIELD

The present invention relates to a display device and a television device.

BACKGROUND ART

Displays in image display devices, such as television devices, are now being shifted from conventional cathode-ray tube displays to thin displays, such as liquid crystal displays and plasma displays. With the thin displays, the thicknesses of the image display devices can be reduced. Liquid crystal panels included in liquid crystal display devices do not emit light, and thus backlight devices are required as separate lighting devices. An edge light-type backlight device including a light guide plate with a light entrance surface on the side and light sources such as LEDs arranged closer to the side of the light guide plate is known as an example of such backlight devices.

With recent increase in size of a liquid crystal display device, a demand for reduction in thickness of the liquid crystal display device or in size of a frame thereof has been raised. Patent document 1 discloses an edge-light type backlight device that can reduce the thickness and the frame-size.

In recent years, a demand for reduction in production cost or a demand for further reduction in thickness has been raised. Therefore, a configuration without a cabinet, which is made of a synthetic resin and serves as an exterior member of a liquid crystal display unit, has been considered. A liquid crystal display device without such a cabinet can reduce the thickness or the frame-size by the size of the cabinet.

RELATED ART DOCUMENT

Patent Document

Patent Document 1: Japanese Unexamined Patent Application Publication No. 2007-80564

Problem to be Solved by the Invention

In a liquid crystal display device including an edge-light type backlight device, components such as a light source board and a heat dissipation member may be arranged close to a light guide plate within a casing. The light source board may include light sources mounted thereon. The heat dissipation member may be located in between the light source board and the casing. The components may have different dimensional accuracy, which may be affected by production unevenness, or different thermal expansion coefficients. If thermal expansion or contraction occurs in the components because of heat generated from the light sources, the components expand or contract in different levels and this may change a distance between the light sources and a light entrance surface.

In the backlight device described in Patent document 1, the light guide plate is sandwiched between two light source boards. If thermal expansion or contraction occurs in the light guide plate or the light source boards, a distance between light sources and a light entrance surface may largely change. The distance change between the light sources and the light entrance surface may decrease light-entering efficiency of light exiting the light sources and entering the light guide plate. Therefore, preferable optical properties cannot be maintained.

DISCLOSURE OF THE PRESENT INVENTION

A technology disclosed herein was made in view of the above circumstances. An object of the technology described herein is to provide a cabinet-less display device in which high light-entering efficiency is maintained even if expansion occurs in a light guide plate.

Means for Solving the Problem

A technology disclosed herein relates to a lighting display including a light source, a display panel, a light guide plate, a chassis, a frame, a light source board, a heat dissipation member, and a fixing screw. The display panel is configured to provide a display using light from the light source. The light guide plate includes one plate surface as a light exit surface, another plate surface as an opposing surface, and at least a side-surface as a light entrance surface. The light guide plate is arranged such that the light exit surface faces an opposite surface of the display panel opposite from a display surface side and the light entrance surface faces the light source. The light guide plate is configured to guide light from the light source toward the display panel. The chassis includes at least a bottom plate and arranged on an opposite side of the light guide plate from the display panel. The frame is arranged on the display surface side of the display panel and holds the display panel, the light source, and the light guide plate between the frame and the chassis. The light source board has a surface on which the light source is mounted and arranged such that the surface thereof is parallel to the light entrance surface. The heat dissipation member having a heat dissipation property includes a contact portion, a bottom portion, and a stand-up portion. The contact portion is in contact with an end portion of the opposing surface close to the light entrance surface. The bottom portion is arranged on the bottom plate along the bottom plate. The stand-up portion projects from the bottom portion toward a display panel side and includes a surface on which the light source board is mounted. The fixing screw is passed through the contact portion and includes a tip portion that is fixed in the opposing surface such that the stand-up portion and the light source board are fixed relative to the light guide plate.

According to the display device, the stand-up portion and the light source board are fixed relative to the light guide plate. Thus, the distance between the light source and the light entrance surface can be restricted. Even when components, such as the light guide plate and the heat dissipation member, thermally expand, the distance between the light source and the light entrance surface is maintained. Therefore, the distance between the light source and the light entrance surface before the thermal expansion and the distance therebetween after the thermal expansion remain constant. With this configuration, even if the component such as the heat dissipation member expands, light-entering efficiency of rays of light exiting the light source and entering through the light entrance surface does not decrease or is less likely to decrease. Namely, proper optical properties can be maintained.

The bottom portion may be arranged on the bottom plate so as to be slidable in a direction perpendicular to the light entrance surface.

In this configuration, if the component such as the heat dissipation member expands in the direction perpendicular to the light entrance surface, the heat dissipation member slides in the direction perpendicular to the light entrance surface by a length corresponding to the expanded amount. With this configuration, a stress exerted on the heat dissipation member is released and thus warping due to the stress does not occur or is less likely to occur in each component. Therefore, the distance between the light source and the light entrance surface is less likely to change.

Any one of the bottom portion and the bottom plate may include a through hole through which an attachment member for attaching the bottom portion to the chassis is to be passed. The through hole may have an oval shape with a major axis along the direction perpendicular to the light entrance surface.

In this configuration, the heat dissipation member is movable in a direction along the major axis of the oval through hole. This provides a specific configuration in which the heat dissipation member can slide in the direction perpendicular to the light entrance surface.

The light source board may have a rectangular shape. The light source may include a plurality of light sources arranged along a longitudinal direction of the light source board. The fixing screw may include a plurality of fixing screws arranged along the longitudinal direction of the light source board.

In this configuration, the heat dissipation member is fixed to the light guide plate with multiple fixing screws. Even if the contact portion of the heat dissipation member warps along the longitudinal direction of the light source board, the distance between the light sources and the light entrance surface does not change or is less likely to change due to the warping. Therefore, the distance between the light sources and the light entrance surface is effectively maintained.

Each of the fixing screws may be located in a position of the contact portion corresponding to a midpoint between the adjacent light sources on the light source board.

In this configuration, each fixing screw is in a position of the contact portion corresponding to an area between the adjacent light sources on the light source board. The contact portion is fixed with the fixing screw while a force is applied to each portion thereof along the longitudinal direction of the light source board. Thus, the distance between the light source and the light entrance surface is maintained constant with appropriate accuracy.

The fixing screw may be passed through a position of the contact portion at an equal distance from the respective light sources that are adjacent to each other on the light source board.

With this configuration, the contact portion is fixed with the fixing screw while a force is applied to each portion thereof corresponding to the area between the adjacent light sources without biasing toward one of the adjacent light sources. Thus, the distance between the light source and the light entrance surface is maintained constant with appropriate accuracy.

The light source may have a light distribution following the Lambertian distribution. The tip portion of the fixing screw may be located in an area and a depth inward from the opposing surface. The area and the depth may not overlap a light distribution area in which light exiting the light source and entering through the light entrance surface is distributed.

In this configuration, the light that exits the light source and enters through the light entrance surface is not blocked by the fixing screw. Therefore, uneven brightness does not occur or is less likely to occur at the light exit surface of the light guide plate due to blocking of light by the fixing screws.

The fixing screw may be made of material having transparency and may be passed through the light source board at a point that is offset from a point that is at an equal distance from the respective light sources that are adjacent to each other on the light source board toward one of the adjacent light sources.

In this configuration, the fixing screw is arranged close to one of the adjacent light sources. Even if rays of light are directed to the fixing screw, the fixing screw does not block the rays of light because the fixing screw has transparency. Therefore, the fixing screw can be fixed at a point of the opposing surface near the light source. Namely, the distance between the light source and the light entrance surface can be fixed with appropriate accuracy.

The contact portion may have a rectangular shape and each of the fixing screws may be passed through an end portion of a long dimension of the contact portion.

With this configuration, the number of the fixing screws is reduced and thus the production process is simplified and components cost is reduced.

In the technology disclosed herein, a display device including a liquid crystal panel using liquid crystals as the display panel has novelty and utility. Further, a television device including the above display device has novelty and utility.

Advantageous Effect of the Invention

According to the technology disclosed herein, in the display device without a cabinet, high light-incidence efficiency is maintained even if expansion of a light guide plate occurs.

MODE FOR CARRYING OUT THE INVENTION

First Embodiment

A first embodiment will be described with reference to FIGS. 1 to 10. A liquid crystal display device 10 according to this embodiment a will be described. X-axis, Y-axis and Z-axis are indicated in some drawings. The axes in each drawing correspond to the respective axes in other drawings. The Y-axis direction corresponds to a vertical direction and the X-axis direction corresponds to a horizontal direction. An upper side and a lower side are based on the vertical direction unless otherwise specified.

Figure 1:
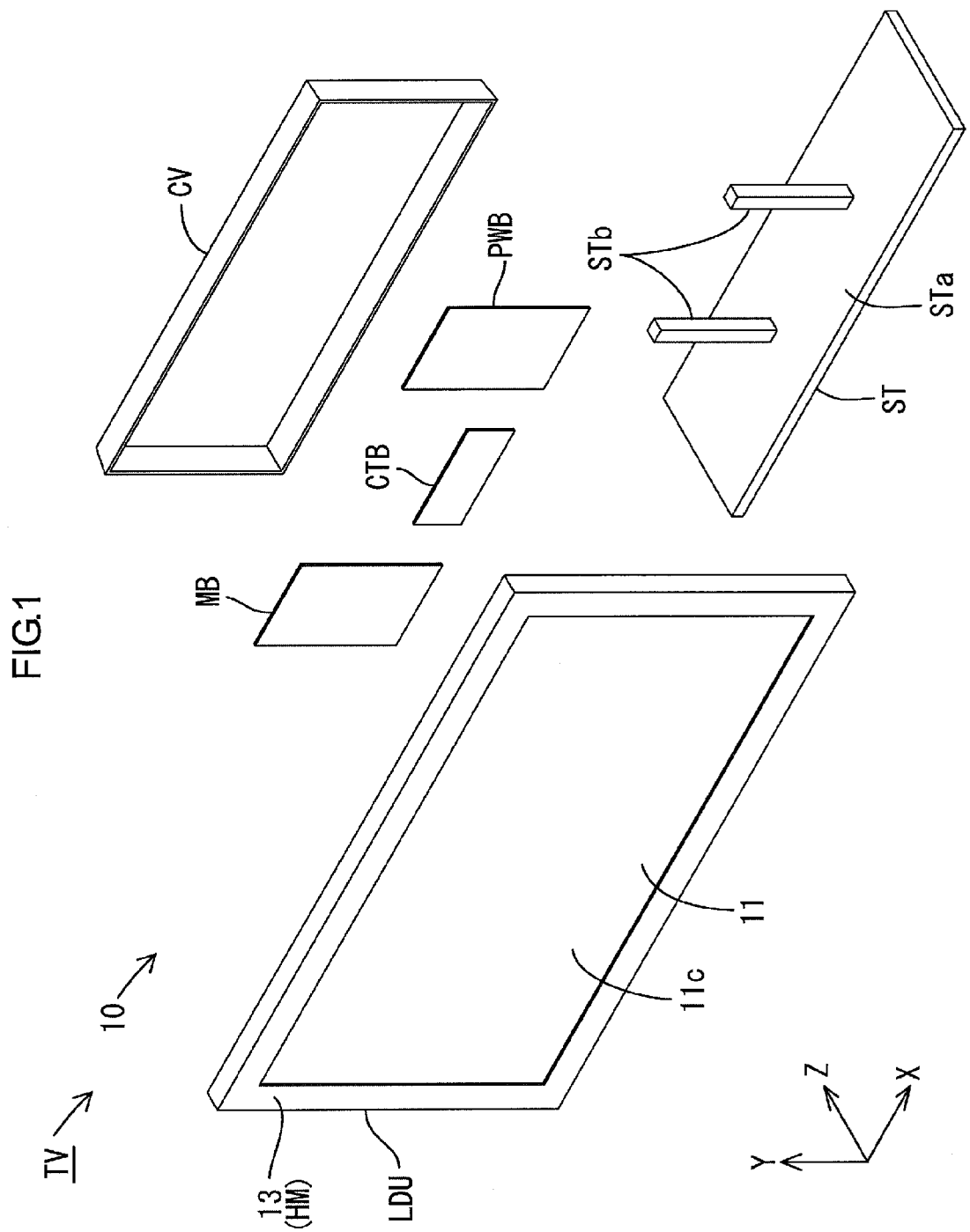
FIG. 1 is an exploded perspective view of a general configuration of a television device TV and a liquid crystal display unit LDU according to a first embodiment.
Figure 2:
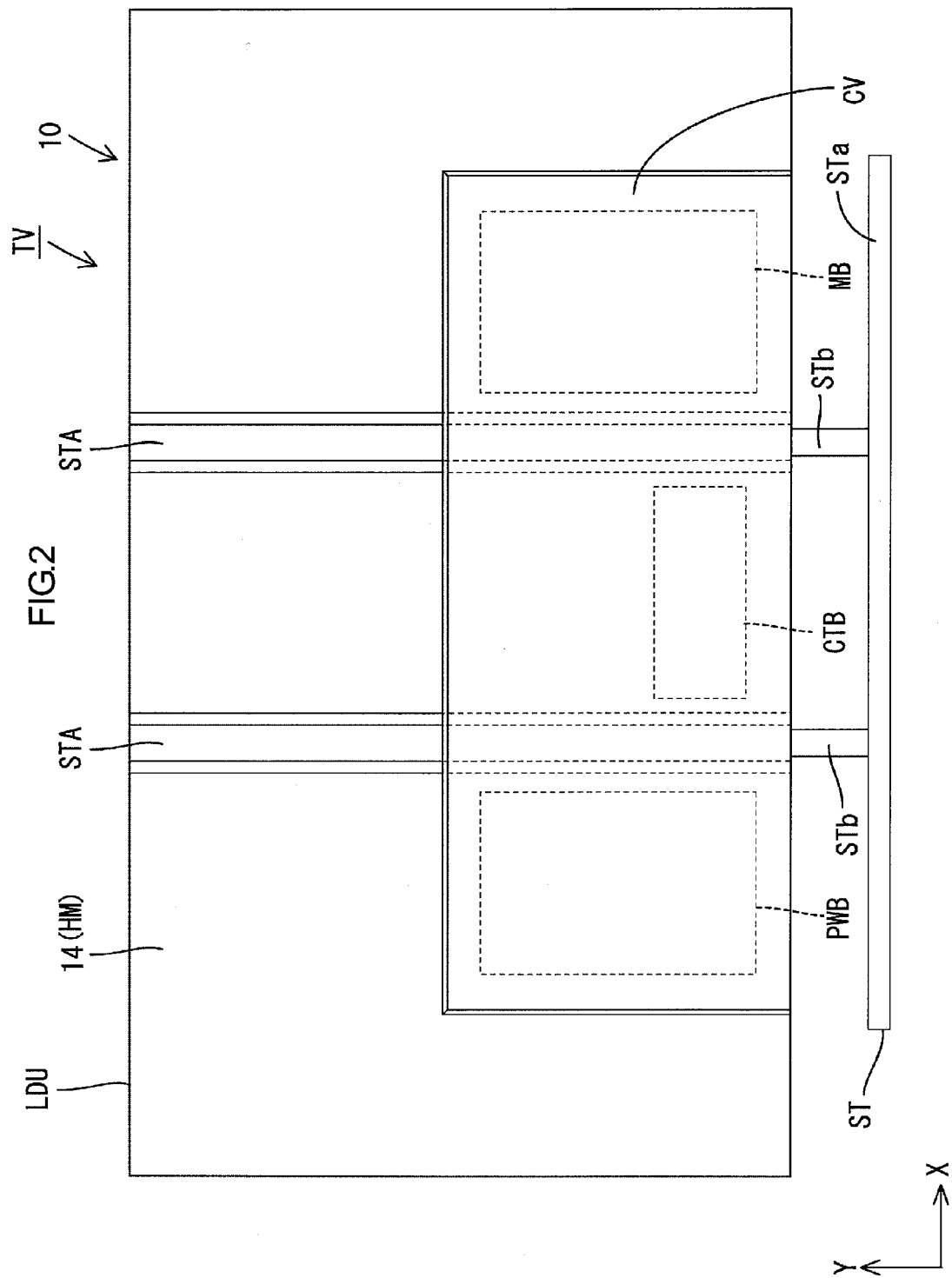
FIG. 2 is a rear view of the television device TV and a liquid crystal display device 10.

A television device TV includes a liquid crystal display unit LDU, boards PWB, MB, and CTB, a cover CV, and a stand ST. The boards PWB, MB, and CTB are attached to a rear surface (aback surface) of the liquid crystal display unit LDU. The cover CV is attached to the rear surface of the liquid crystal display unit LDU so as to cover the boards PWB, MB, and CTB. The stand ST holds the liquid crystal display unit LDU such that a display surface of the liquid crystal display unit LDU extends in the vertical direction (the Y-axis direction). The liquid crystal display device 10 according to this embodiment has the same configuration as the above-described television device TV except for at least a component for receiving television signals (e.g. a tuner included in a main board MB). As illustrated in FIG. 2, the liquid crystal display unit LDU has a landscape rectangular overall shape (rectangular and longitudinal). The liquid crystal display unit LDU includes a liquid crystal panel 16 as a display panel and a backlight device 12 as a light source. The liquid crystal panel 11 and the backlight device 12 are collectively held by a frame 14 and a chassis 14. The frame 13 and the chassis 14 are external members that provide an external configuration of the liquid crystal display device 10. The chassis 14 in this embodiment is one of the components to form the exterior and a part of the backlight device 12.

Configurations of the liquid crystal display device 10 on a rear surface side will be described. As illustrated in FIG. 2, stand fitting members STA are attached to a rear surface of the chassis 14 that provides an external configuration of the back of the liquid crystal display device 10. The stand fitting members STA are spaced away from each other in an X-axis direction and extend along the Y-axis direction. Each stand fitting member STA has a cross section that corresponds to a cross section of a channel beam and opens to the chassis 14. A space is provided between the stand fitting member STA and the chassis 14. Support portions STb included in the stand ST are inserted in the respective stand fitting members STA. The space provided in the stand fitting member STA is configured to be a path through which wiring members (e.g. electric wires) which are connected to an LED board 18 are passed. The LED board 18 is included in the backlight device 12. The stand ST includes a base STa and the support portions STb. The base STa extends parallel to the X-Z plane. The support portions STb stand on the base STa in the Y-axis direction. The cover CV is made of synthetic resin and attached to a part of the rear surface of the chassis 14. Specifically, as illustrated in FIG. 2, the cover CV covers a lower half part of the chassis 14 so as to cross over the stand fitting members STA in the X-axis direction. A component storage space is provided between the cover CV and the chassis 14 such that the boards PWB, MB, and CTB, which will be described next, are arranged therein.

As illustrated in FIG. 2, the liquid crystal display device 10 includes a power source board PWB, a main board MB, and a control board CTB as the boards PWB, MB, and CTB. The power source board PWB will be referred to as a power supply of the liquid crystal display device 10 and supplies drive power to the other boards MB and CTB and LEDs (an example of light sources) 17 included in the backlight device 12. Namely, the power source board PWB also serves as "an LED drive board that drives the LEDs 17". The main board MB includes at least a tuner and an image processor, which are not illustrated. The tuner is configured to receive television signals. The image processor performs image processing on the received television signals. The main board MB is configured to output the processed image signals to the control board CTB, which will be described next. If an external image reproducing device, which is not illustrated, is connected to the liquid crystal display device 10, image signals from the image reproducing device are input to the main board MB. The image processor included in the main board MB processes the image signals, and the main board MB outputs the processed image signals to the control board CTB. The control board CTB is configured to convert the image signals, which is sent from the main board, to driving signals for liquid crystals and to supply the driving signals to the liquid crystal panel 11.

Figure 3:
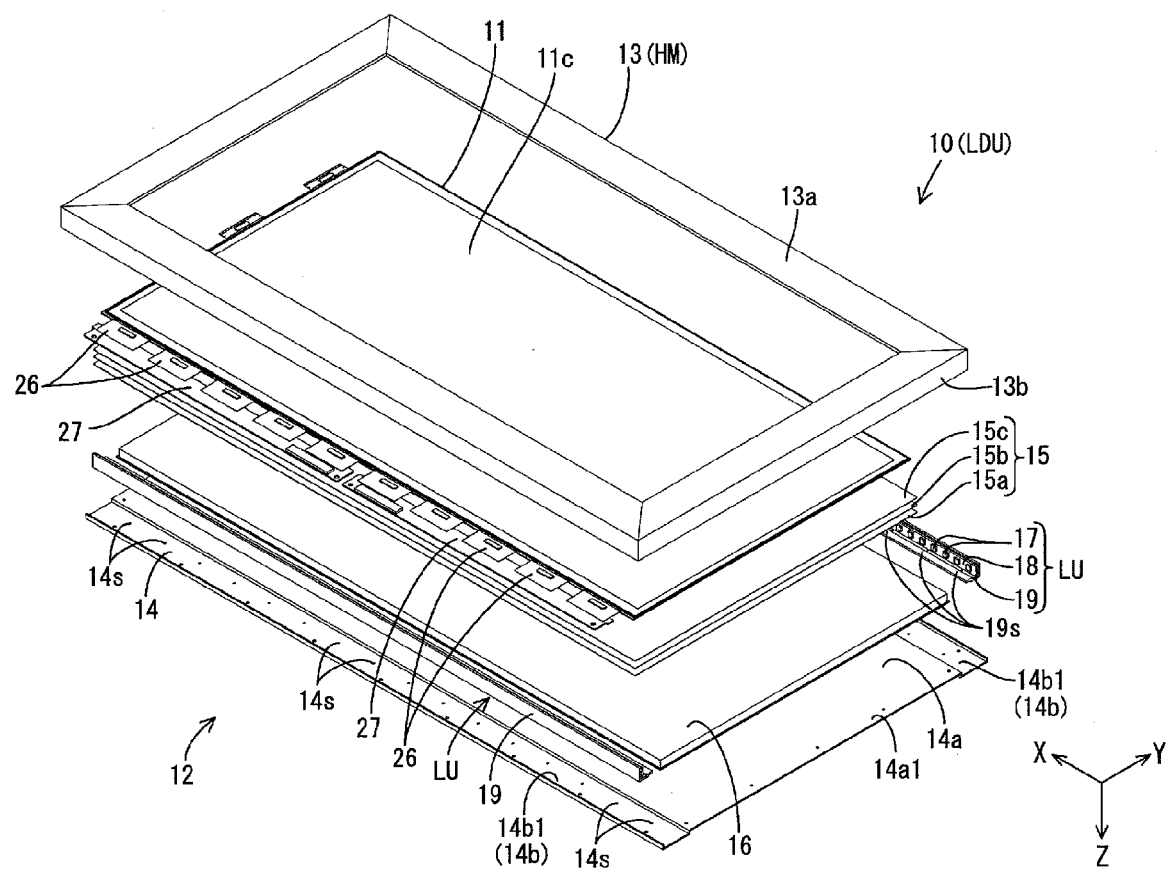
FIG. 3 is an exploded perspective view of a general configuration of the liquid crystal display unit LDU of the liquid crystal display device 10.

As illustrated in FIG. 3, components of the liquid crystal display unit LDU included in the liquid crystal display device 10 are arranged in a space provided between the frame 13 that provides a front external configuration and the chassis 14 that provides a rear external configuration. The components arranged between the frame 13 and the chassis 14 are at least the liquid crystal panel 11, an optical member 15, a light guide plate 16, and LED units 20. The liquid crystal panel 11, the optical member 15, and the light guide plate 16 are placed on top of one another and held between the frame 13 on the front side and the chassis 14 on the rear side. The backlight device 12 includes the optical member 15, the light guide plate 16, the LED units LU, and the chassis 14. Namely, the liquid crystal display unit LDU without the liquid crystal panel 11 and the frame 13 is the backlight device 12. The LED units LU included in the backlight device 12 are arranged in the space between the frame 13 and the chassis 14. Two LED units LU are each arranged on each end of the short dimension of the light guide plate 16 (in the Y-axis direction). Each LED unit LU includes LEDs 17 as light sources, the LED board 18, and a heat dissipation member (a heat spreader) 19. The LEDs 17 are mounted on the LED board 18. The LED board 18 is attached to the heat dissipation member 19. Each component will be described next.

As illustrated in FIG. 3, the liquid crystal panel has a landscape rectangular shape (rectangular and longitudinal) in a plan view and includes a pair of glass substrates 11a and 11b (see FIG. 4) and liquid crystals. The substrates 11a and 11b having high light transmissivity are bonded together with a predetermined gap therebetween. The liquid crystals are sealed between the substrates 11a and 11b. On one of the substrates (an array substrate 11b), switching elements (e.g. TFTs), pixel electrodes, and an alignment film are arranged. The switching elements are connected to gate lines and source lines that are arranged perpendicular to each other. The pixel electrodes are connected to the switching elements. On the other one of the substrates (a CF substrate 11a), color filters, a counter electrode, and an alignment film are arranged. The color filters include red (R), green (G), and blue (B) color portions that are arranged in a predetermined arrangement. The liquid crystal panel 11 is placed on a front side of the optical member 15, which will be described later. A rear-side surface of the liquid crystal panel 11 (an outer-side surface of a polarizing plate on the rear side) is fitted to the optical member 15 with minimal gaps therebetween. Therefore, dust is less likely to enter between the liquid crystal panel 11 and the optical member 15. The liquid crystal panel 11 includes a display surface 11c. The display surface 11c includes a display area and a non-display area. The display area is an inner area of a screen in which images are displayed. The non-display area is an outer area of the screen around the display area with a frame-like shape. The liquid crystal panel 11 is connected to the control board CTB via a driver for driving the liquid crystals and flexible boards 26. The liquid crystal panel 11 displays an image in the display area of the display surface 11c based on signals sent from the control board CTB. The polarizing plates, which are not illustrated, are arranged on outer sides of the substrates 11a and 11b.

As illustrated in FIG. 3, similar to the liquid crystal panel 11, the optical member 15 has a landscape rectangular shape in a plan view and has the same size (a short-side dimension and a long-side dimension) as the liquid crystal panel 11. The optical member 15 is placed on the front side (a light exit side) of the light guide plate 16, which will be described later, and sandwiched between the light guide plate 16 and the liquid crystal panel 11. The optical member 15 includes three sheets that are placed on top of one another. Specifically, a diffuser sheet 15a, a lens sheet (a prism sheet) 15b, and a reflecting type polarizing sheet 15c are placed on top of one another in this sequence from the rear side (the light guide plate 16 side). Each of the three sheets 15a, 15b, and 15c has the substantially same size in a plan view.

Figure 4:
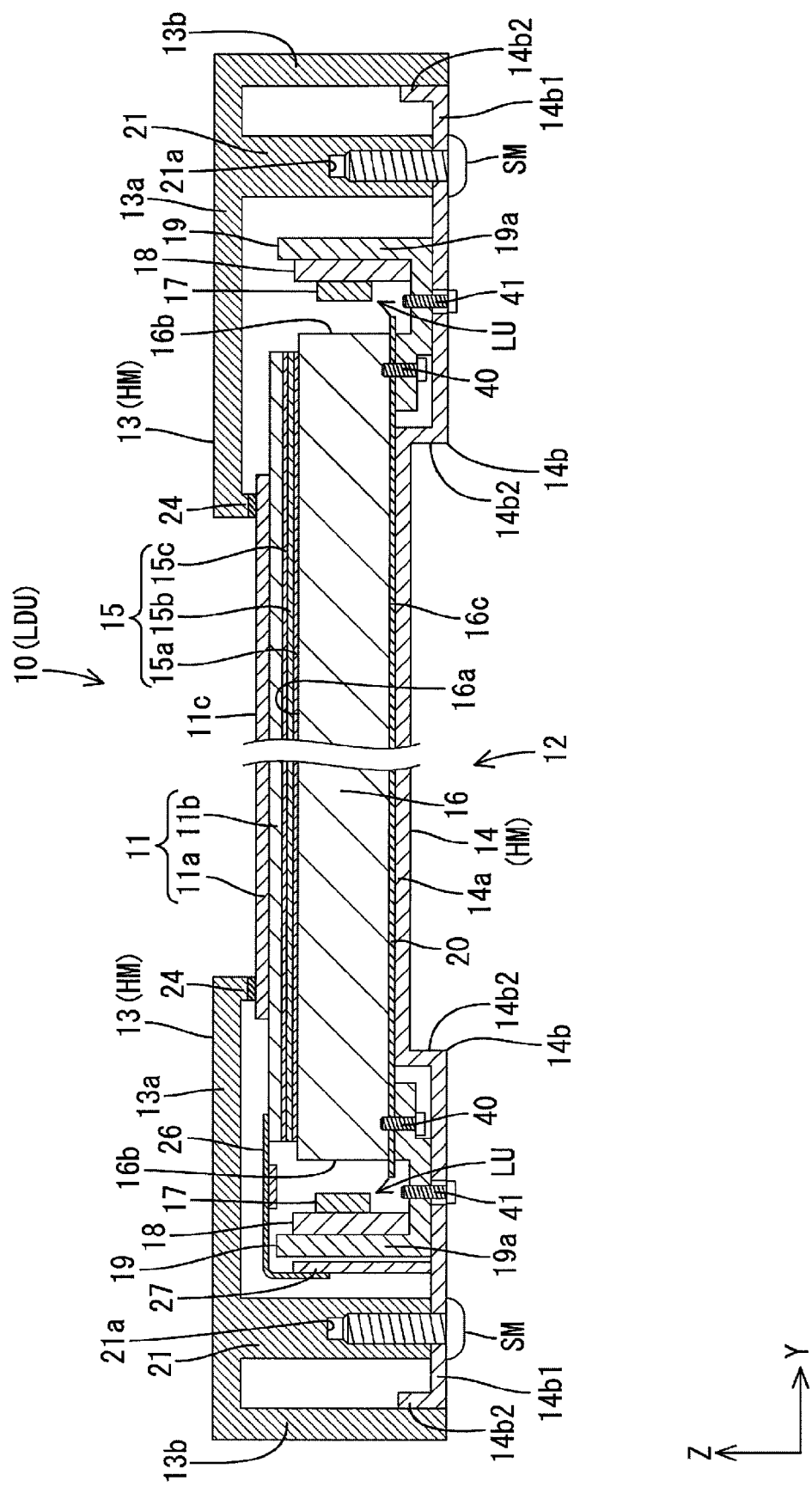
FIG. 4 is a cross-sectional view of the liquid crystal display device 10 taken along a short-side direction thereof.

The light guide plate 16 is made of substantially transparent (high transmissivity) synthetic resin (e.g. acrylic resin or polycarbonate such as PMMA) that has a refractive index sufficiently higher than that of the air. As illustrated in FIG. 3, the light guide plate 16 has a landscape rectangular shape in a plan view similar to the liquid crystal panel 11 and the optical member 15. A thickness of the light guide plate 16 is larger than a thickness of the optical member 15. A long-side direction and a short-side direction of a main surface of the light guide plate 16 correspond to the X-axis direction and the Y-axis direction, respectively. A thickness direction of the light guide plate 16 that is perpendicular to the main surface of the light guide plate 16 corresponds to the Z-axis direction. The light guide plate 16 is arranged on the rear side of the optical member 15 and sandwiched between the optical member 15 and the chassis 14. As illustrated in FIG. 4, at least a short-side dimension of the light guide plate 16 is larger than those of the liquid crystal panel 11 and the optical member 15. The light guide plate 16 is arranged such that ends of the short dimension thereof (i.e., ends along a long-side direction of the light guide plate 16) protrude over ends of the liquid crystal panel 11 and the optical member 15 (so as not to overlap in a plan view). The LED units LU are arranged on sides of the short dimension of the light guide plate 16 so as to have the light guide plate 16 between the LED units LU in the Y-axis direction. Light from the LEDs 17 enters the light guide plate 16 through the ends of the short dimension of the light guide plate 16. The light guide plate 16 is configured to guide the light, which is from the LEDs 17 and enters the light guide plate 16 through the ends of the short dimension, toward the optical member 15 (on the front side).

One of the main surfaces of the light guide plate 16 facing the front side (a surface opposite the optical member 15) is a light exit surface 16a. Light exits the light guide plate 16 through the light exit surface 16a toward the optical member 15 and the liquid crystal panel 11. The light guide plate 16 includes outer peripheral end surfaces that are adjacent to the main surfaces of the light guide plate 16, and long-side end surfaces (end surfaces of the short dimension) which have elongated shapes along the X-axis direction are opposite the LEDs 17 (the LED boards 18). A predetermined space is provided between each long-side end and the LEDs 17 (the LED boards 18). The long-side end surfaces are light entrance surfaces 16b through each of which light from LEDs 17 enters. As illustrated in FIG. 4, the light guide plate 16 includes a rear surface, which is an opposing surface 16c (a surface facing the chassis 14) opposite from the light exit surface 16a. A reflection sheet 20 covers an entire area of the opposing surface 16c. The opposing surface 16c includes multiple screw holes 16s. The screw holes 16s are arranged at equal intervals along a longitudinal direction of the opposing surface 16c (i.e., the X-axis direction). Each screw hole 16s extends so as to opens to a rear outside (a chassis 14 side) of the light guide plate 16 with a round opening. A tip portion 40b1 of the fixing screw 40, which will be described later, is fitted in the screw hole 16s. The opposing surface 16c has an end portion close to the light entrance surface 16b. A contact portion 19c of a heat dissipation member 19, which will be described later, is in contact with the end portion so as to overlap the screw holes 16s in a plan view.

The reflection sheet 20 is arranged so as to be sandwiched between the chassis 14 and the light guide plate 16. Light that exits the light guide plate 16 through the opposing surface 16c toward the rear side is reflected by the reflection sheet 20 toward the front side. The reflection sheet 20 is made of synthetic resin and has a white surface having high light reflectivity. A short-side dimension of the reflection sheet 20 is larger than that of the light guide plate 16. The reflection sheet 20 is arranged such that ends of the short dimension thereof protrude closer to the LEDs 17 compared to the light entrance surfaces 16b of the light guide plate 16. Light that travels at an angle from the LEDs 17 toward the chassis 14 is effectively reflected toward the light entrance surfaces 16b of the light guide plate 16 by the protruded portions of the reflection sheet 20. The reflection sheet 20 includes an end portion close to the light entrance surface 16b and the end portion has through holes (not illustrated). The through holes extend through the reflection sheet 20 so as to correspond to the respective screw holes 16s and contact-portion through holes 19s, which will be described later. Fixing screws 40, which will be described later, are inserted in the respective through holes.

Next, configurations of the frame 13 and the chassis 14 that constitute the exteriors and a holding member HM will be described. The frame 13 and the chassis 14 are made of metal such as aluminum. Therefore, the mechanical strength (rigidity) and thermal conductivity of the frame 13 and the chassis 14 are higher than those of a frame and a chassis made of synthetic resin. As illustrated in FIG. 3, the frame 13 and the chassis 14 hold the LED units LU at ends of the short dimensions of the frame 13 and the chassis 14 (at the respective long sides). The frame 13 and the chassis 14 hold the liquid crystal panel 11, the optical member 15, and the light guide plate 16, which are placed on top of the other, from the front side and the rear side.

As illustrated in FIG. 3, the frame 13 has a landscape rectangular shape so as to surround the display area in the display surface 11c of the liquid crystal panel 11. The frame 13 includes a panel holding portion 13a and a sidewall 13b. The panel holding portion 13a is parallel to the display surface 11c of the liquid crystal panel 11 and presses the liquid crystal panel 11 from the front side. The sidewall 13b protrudes from an outer peripheral portion of the panel holding portion 13a toward the rear side. The panel holding portion 13a and the sidewall 13b form an L-like shape in a cross section. The panel holding portion 13a forms a landscape-rectangular and frame-like shape that corresponds to an outer portion (the non-display area, a frame-like portion) of the liquid crystal panel 11. The panel holding portion 13*a* presses a substantially entire area of the outer portion of the liquid crystal panel 11 from the front side. The panel holding portion 13*a* has a width that is large enough to cover not only the outer portion of the liquid crystal panel 11 but also an outer portion of the optical member 15, an outer portion of the light guide plate 16, and LED units LU from the front side. The outer portions of the optical member 15 and the light guide plate 16 and the LED units LU are located on the outer side with respect to the outer portion of the liquid crystal panel 11 in a radiation direction. Similar to the display surface 11*c* of the liquid crystal panel 11, a front exterior surface of the panel holding portion 13*a* (i.e., an opposed surface from the surface facing the liquid crystal panel 11) is seen from the front side of the liquid crystal display device 10. The panel holding portion 13*a* constitutes a front exterior of the liquid crystal display device 10 together with the display surface 11*c* of the liquid crystal panel 11. The sidewall 13*b* has a substantially rectangular hollow shape and protrudes from the outer peripheral portion (specifically, an outer peripheral end portion) of the panel holding portion 13*a* toward the rear side. The sidewall 13*b* entirely surrounds the liquid crystal panel 11, the optical member 15, the light guide plate 16, and the LED units LU, which are arranged in the space between the frame 13 and the chassis 14. The sidewall 13*b* surrounds an entire periphery of the rear chassis 14 on the rear side. An outer surface of the sidewall 13*b* that extends along an outer peripheral surface of the liquid crystal display device 10 can be seen from the outside of the liquid crystal display device 10. Therefore, the outer surface of the sidewall 13*b* constitutes a top surface, a bottom surface, and side surfaces of the liquid crystal display device 10.

Figure 5:
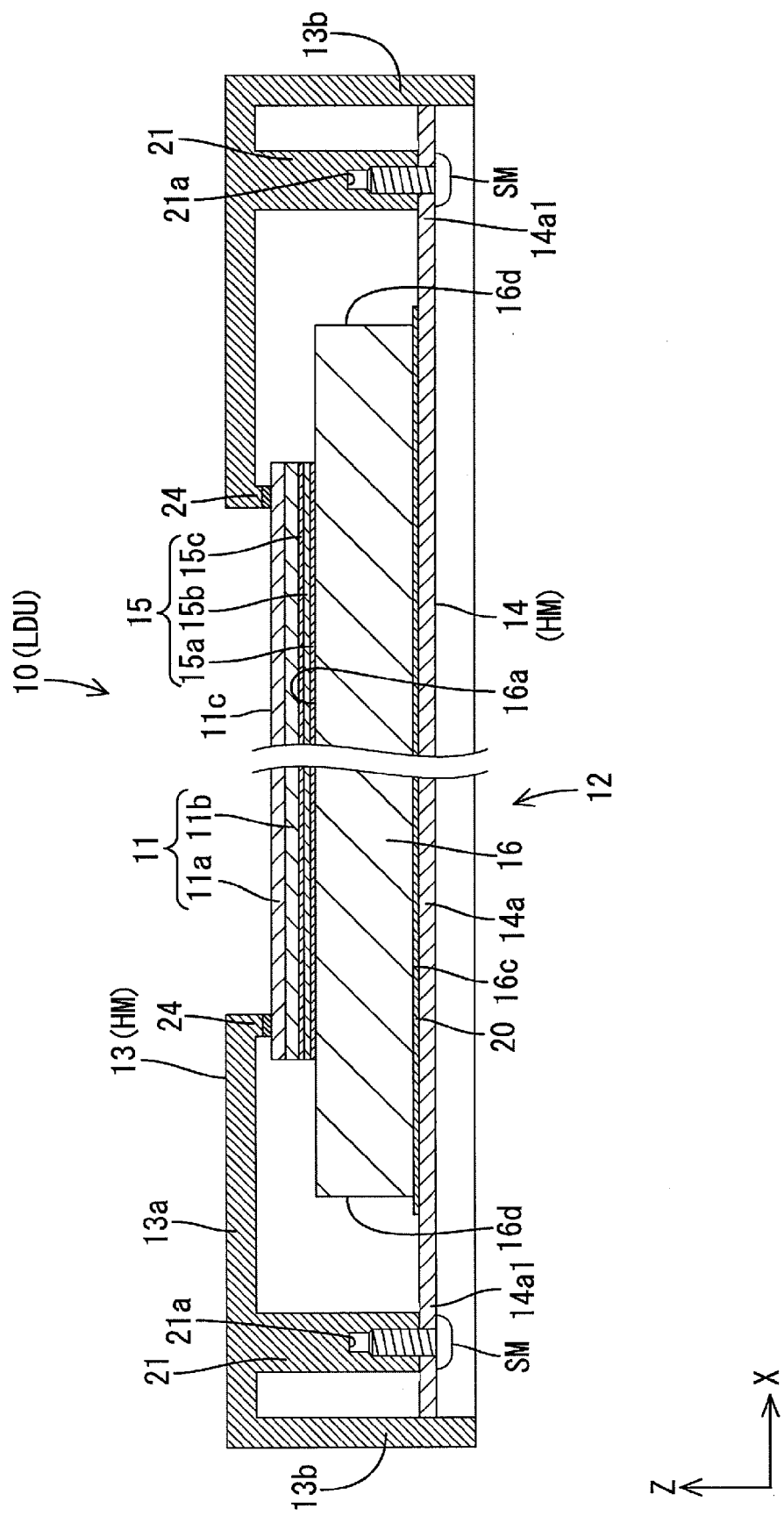
FIG. 5 is a cross-sectional view of the liquid crystal display device 10 taken along a long-side direction thereof.

As illustrated in FIGS. 4 and 5, the panel holding portion 13*a* includes a holding protrusion 24 as a part thereof. The holding protrusion 24 protrudes from an inner edge of the panel holding portion 13*a* toward the rear-surface side, that is, toward the liquid crystal panel 11. The holding protrusion 24 includes a shock absorber 24*a* (see FIG. 6) at its protruded end. The holding protrusion 24 presses the liquid crystal panel 11 from the front side via the shock absorber 24*a* in between. As illustrated in FIGS. 4 and 5, the panel holding portion 13*a* includes screw attachment portions 21 as a part thereof. Each of the screw attachment portions 21 is located closer to an interior side than the sidewall 13*b* of the panel holding portion 13*a* (a position close to the light guide plate 16). Screw members SM are attached to the screw attachment portion 21. The screw attachment portion 21 protrudes from an inner surface of the panel holding portion 13*a* in the Z-axis direction toward the rear side and has an elongated block-like shape that extends along each side of the panel holding portion 13*a* (in the X-axis direction or the Y-axis direction). As illustrated in FIGS. 4 and 5, the screw attachment portion 21 includes a groove 21*a* that opens to the rear side and to which the screw member SM is fastened. As illustrated in FIG. 4, a predetermined gap is provided between each screw attachment portion 21 on a long side and a corresponding stand-up portion 19*a*. As illustrated in FIG. 4, one of the heat dissipation members 19 overlaps the flexible boards 26 in a plan view. A space is provided between the heat dissipation member 19 and the screw attachment portion 21 to which the heat dissipation member 19 is attached. Printed circuit boards 27 are arranged in the space. Each of the printed circuit boards 27 includes the flexible boards 26 that are arranged at intervals in a long-side direction of the printed circuit board 27. The flexible boards 26 are connected to the printed circuit board 27 at the other end thereof. The printed circuit board 27 includes a connector (not illustrated) to which an end of an FPC (not illustrated) is connected. The other end of the FPC extends to the rear side of the chassis 14 through an FPC hole (not illustrated) in the chassis 14 and is connected to the control board CTB.

As illustrated in FIG. 3, the chassis 14 has a substantially longitudinal shallow tray shape as a whole and covers overall areas of the light guide plate 16 and the LED unit LU from the rear side. A rear outer surface of the chassis 14 (a surface of the chassis 14 opposite from a surface that faces the LED unit LU) is seen from the rear side and constitutes a back surface of the liquid crystal display device 10. The chassis 14 includes a bottom-plate portion 14*a* and a pair of LED holding portions (an example of the bottom plate) 14*b*. The bottom-plate portion 14*a* has a landscape rectangular shape similar to the light guide plate 16. Each of the LED holding portions 14*b* protrudes from a long-side edge of the bottom-plate portion 14*a* toward the rear side to form a step. The LED units LU are arranged in the respective LED holding portions 14*b*.

As illustrated in FIGS. 3 and 4, the bottom-plate portion 14*a* has a plane plate shape so as to receive a large portion of the light guide plate 16 in its middle portion with respect to the short-side direction (except the end portions with respect to the short-side direction) from the rear side. The bottom-plate portion 14*a* will be referred to as a light guide plate receiving portion. As illustrated in FIG. 3, ends of long dimension of the bottom-plate portion 14*a* extend over the respective ends of the long dimension of the light guide plate 16. The ends of the bottom-plate portion 14*a* are screw mount portions 14*a*1 to which the screw members SM are attached from the outside. The screw members SM hold the frame 13 and the chassis 14 in a fixed condition.

Figure 6:
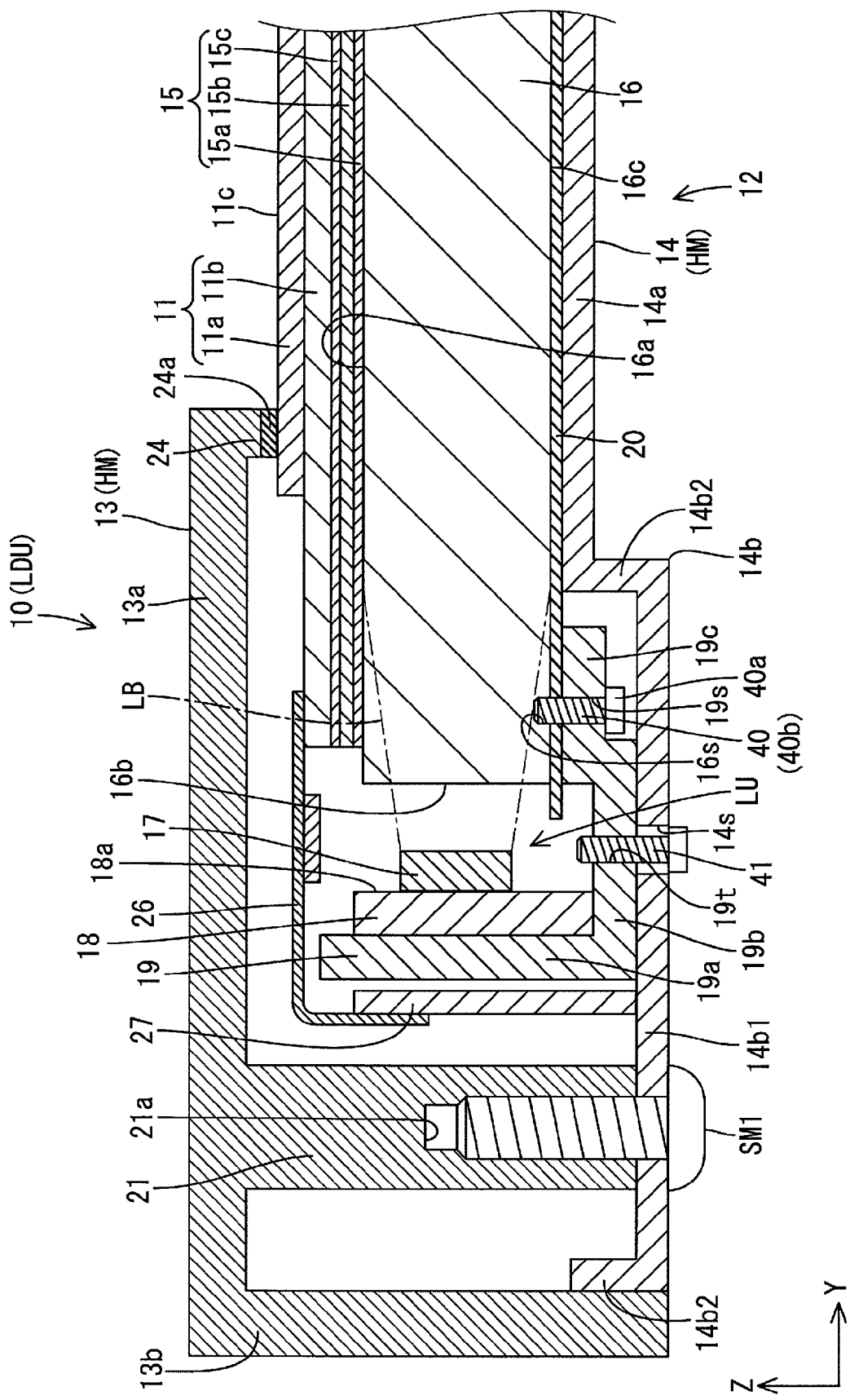
FIG. 6 is a magnified cross-sectional view of a major part of the light crystal display device 10, illustrating a fixing screw 40 and its vicinity in FIG. 5.
Figure 9:
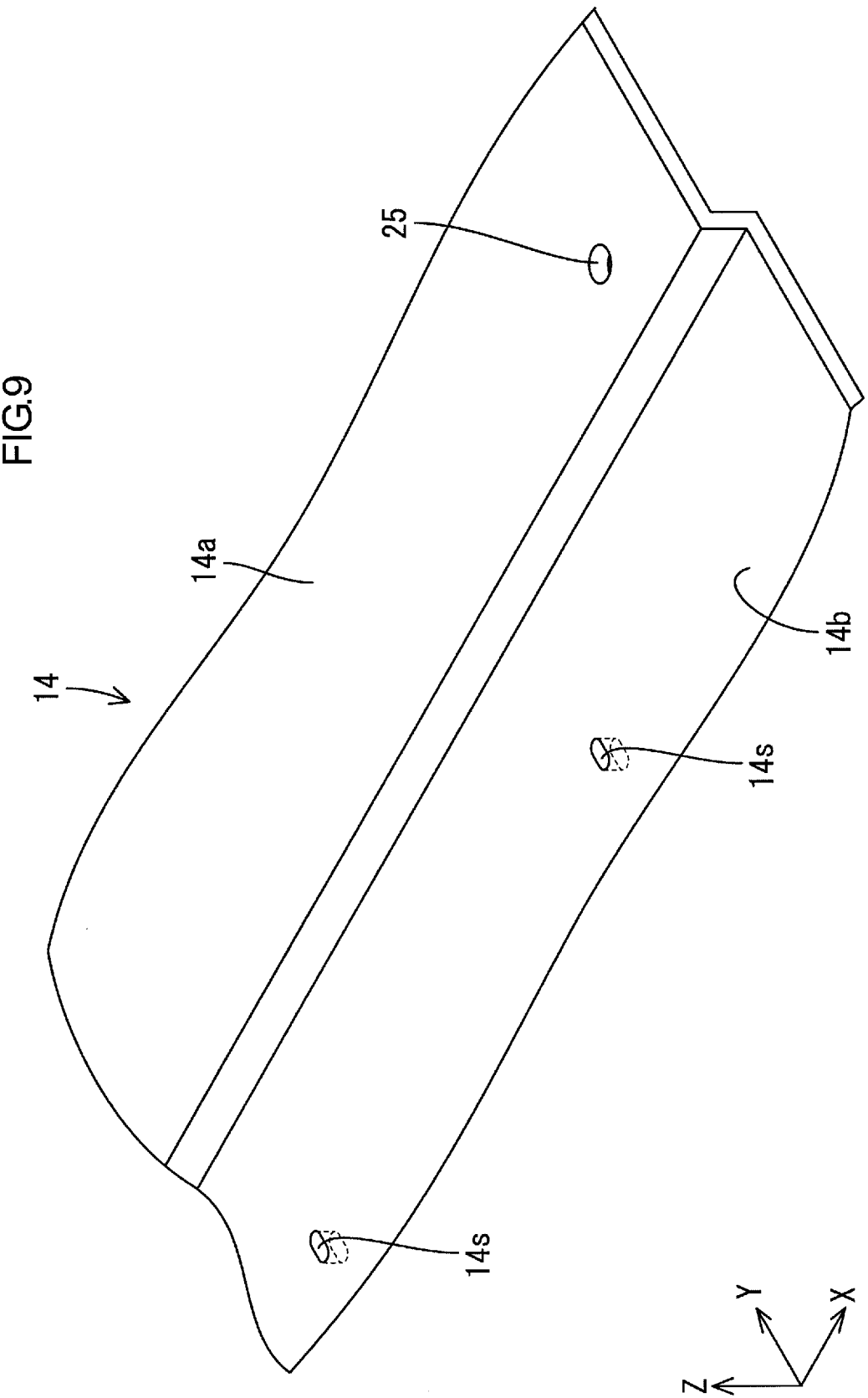
FIG. 9 is a magnified perspective view of a heat dissipation member 19 on a front side, illustrating an end portion of the heat dissipation member 19 in a long-side direction thereof.

As illustrated in FIGS. 3 and 4, the LED holding portions 14*b* are located so as to sandwich the bottom-plate portion 14*a* from ends of the short dimension of the bottom-plate portion 14*a*. Each LED holding portion 14*b* is recessed from the bottom plate portion 14*a* toward the rear side to have a space in which the LED unit LU is arranged. The LED holding portion 14*b* includes a screw mount portion 14*b*1 and a pair of side-plate portions 14*b*2. The screw mount portion 14*b*1 is parallel to the bottom-plate portion 14*a* and the screw members SM are attached thereto from the outside. The side-plate portions 14*b*2 project from ends of the screw mount portion 14*b*1 toward the front side. One of the side-plate portions 14*b*2 on the inner side continues to the bottom-plate portion 14*a*. An inner surface of the screw mount portion 14*b*1 of the LED holding portion 14*b* is in surface-contact with a bottom portion 19*b* of the heat dissipation member 19 of the LED unit LU. The other one of the side-plate portions 14*b*2 of the LED holding portion 14*b* on the outer side is fitted in a space provided between the long-side screw attachment portion 21 and the sidewall 13*b*. The side-plate portion 14*b*2 on the outer side has a positioning function with which the chassis 14 is properly positioned with respect to the frame 13 in the Y-axis direction. The LED housing portion 14*b* includes a portion that is in surface-contact with the bottom portion 19*b* of the heat dissipation member 19, which will be described later. The portion of the LED housing portion 14*b* has chassis through holes (an example of oval through holes) 14*s* that extend through the LED holding portion 14*b* in the thickness direction (the Z-axis direction). The chassis through holes 14*s* are arranged along the longitudinal direction of the LED board 18 (the X-axis direction). As illustrated in FIGS. 6 and 9, each of the chassis through holes 14*s* has an oval shape with a major axis that extends in a direction perpendicular to the light entrance surface 16*b* of the light guide plate 16. Attachment screws (an example of attachment members) 41, which will be described later, are inserted in the respective chassis through holes 14s.

Next, configurations of the LEDs 17 and the LED board 18 included in the LED unit LU will be described. Each LED 17, which is included in the LED unit LU, includes an LED chip (not illustrated). The LED chip is arranged on a board that is fixed on a surface of the LED board 18 facing the light guide plate 16 and sealed with resin. The LED chip mounted on the board has one main light emission wavelength. Specifically, the LED chip that emits light in a single color of blue is used. The resin that seals the LED chip contains phosphors dispersed therein. The phosphors emit light in a predetermined color when excited by blue light emitted from the LED chip. Thus, overall color of light emitted from the LED 17 is white. The phosphors may be selected, as appropriate, from yellow phosphors that emit yellow light, green phosphors that emit green light, and red phosphors that emit red light. The phosphors may be used in combination of the above phosphors. The LED 17 includes a main light-emitting surface that is opposite the light entrance surfaces 16b of the light guide plate 16. Namely, the LED 17 is so-called a top-surface-emitting type LED having a light distribution according to the Lambertian distribution.

As illustrated in FIG. 3, each LED board 18 included in the LED unit LU has an elongated plate-like shape and extends in the long-side direction of the light guide plate 16 (the X-axis direction, the long-side direction of the light entrance surface 16b). The LED boards 18 are arranged in a space between the frame 13 and the chassis 14 such that a plate surface of each LED board 18 is parallel to the X-Z plane, that is, parallel to the light entrance surface 16b of the light guide plate 16. Each LED board 18 has a long-side dimension that is about a half of the long-side dimension of the light guide plate 16. The LED board 18 includes amount surface 18a on which the LEDs 17 are surface-mounted. The mount surface 18a is a plate surface that faces inward, namely, a plate surface that faces the light guide plate 16 (the surface opposite the light guide plate 16). The LEDs 17 are arranged in a line (i.e., linearly) at intervals on the mount surface 18a of the LED board 18 along the long-side direction of the LED board 18 (the X-axis direction). In other words, multiple LEDs 17 are arranged apart from each other along long-side ends of the backlight device 12. Distances between the adjacent LEDs 17 in the X-axis direction are substantially equal, that is, the LEDs 17 are arranged at substantially equal intervals. An arrangement direction of the LEDs 17 corresponds to the longitudinal direction of the LED board 18 (the X-axis direction). A Metal-film trace (not illustrated), such as copper-foil trace, is formed on the mount surface 18a of the LED board 18. The metal-film trace extends in the X-axis direction and crosses over a group of the LEDs 17 so as to connect the adjacent LEDs 17 in series. Terminals at ends of the trace are electrically connected to the power source board PWB via wiring members including connecters and electric wires. Thus, driving power is supplied to the LEDs 17. The LED board 18 includes board through holes 18s. Each board through hole 18s has a round opening and extends through the LED board 18 in a thickness direction of the LED board 18 (the Y-axis direction). The fixing screws 40, which will be described later, are inserted in the respective board through holes 18s.

Next, configurations of the heat dissipation members 19 included in the LED units LU will be described. Further, configurations and arrangements of the fixing screws 40 and attachment screws 41, which are provided to attach the heat dissipation member 19 to the light guide plate 16 and the chassis 14, respectively, will be described. The heat dissipation member 19 included in each LED unit LU is made of metal having high thermal conductivity, such as aluminum. As illustrated in FIG. 6, the heat dissipation member 19 includes a stand-up portion 19a, a bottom portion 19b, and the contact portion 19c. The LED board 18 is attached to the stand-up portion 19a. The bottom portion 19b is in surface-contact with a plate surface of the chassis 14. The contact portion 19c is in contact with the end portion of the opposing surface 16c of the light guide plate 16 on the light entrance surface 16b side. The stand-up portion 19a and the bottom portion 19b and the contact portion 19c form an angle so as to have a substantially L-like shape in a cross-section. The heat dissipation member 19 has a long dimension substantially equal to the long dimension of the LED board 18. As illustrated in FIGS. 3 and 6, the stand-up portion 19a of the heat dissipation member 19 has a plate-like shape parallel to the plate surface of the LED board 18 and the light entrance surface 16b of the light guide plate 16. A long-side direction, a short-side direction, and a thickness direction of the stand-up portion 19a are aligned with the X-axis direction, the Z-axis direction, and the Y-axis direction, respectively. The LED board 18 is mounted on an inner surface of the stand-up portion 19a, which is a plate surface that faces the light guide plate 16. While the stand-up portion 19a has a long dimension that is substantially equal to the long dimension of the LED board 18, a short dimension of the stand-up portion 19a is larger than a short dimension of the LED board 18. Therefore, ends of the short dimension of the stand-up portion 19a protrude over the LED board 18 in the Z-axis direction. An outer plate surface of the stand-up portion 19a, which is a plate surface of the stand-up portion 19a opposite from the plate surface on which the LED board 18 is attached, faces the screw attachment portion 21 of the frame 13. The stand-up portion 19a is located between the screw attachment portion 21 of the frame 13 and the light guide plate 16. The stand-up portion 19a projects from an outer end of the bottom portion 19b, which is an end of the bottom portion 19b close to the screw attachment portion 21 (closer to the sidewall 13b), in the Z-axis direction (a direction in which the liquid crystal panel 11, optical member 15, and the light guide plate 16 overlap each other) toward the front side, that is, toward the frame 13.

As illustrated in FIGS. 3 and 6, the bottom portion 19b of the heat dissipation member 19 has a plate-like shape and is parallel to the plate surface of the chassis 14. A long-side direction, a short-side direction, and a thickness direction of the bottom portion 19b are aligned with the X-axis direction, the Y-axis direction, and the Z-axis direction, respectively. The bottom portion 19b extends from a rear-side end of the stand-up portion 19a in the Y-axis direction toward an inner side. In other words, the bottom portion 19b extends from an end of the stand-up portion 19a closer to the chassis 14 in an opposite direction to the light guide plate 16. The bottom portion 19b has a long dimension substantially equal to the long dimension of the stand-up portion 19a. An entire rear plate surface of the bottom portion 19b, which is a plate surface of the bottom portion 19b facing the chassis 14, is in surface-contact with the plate surface of the chassis 14. A front plate surface of the bottom portion 19b, which is a plate surface opposite from the surface in contact with the chassis 14, faces the LEDs. An entire area of the bottom portion 19b is in surface-contact with the chassis 14. With this configuration, heat generated from the LEDs 17 as they are turned on is transferred to the chassis 14 via the LED board 18, the stand-up portion 19a, and the bottom portion 19b. Therefore, heat is effectively released to the outside of the liquid crystal display device 10 and thus the heat is less likely to stay therein.

The bottom portion 19b includes bottom-portion through holes 19t at positions corresponding to the chassis through holes 14s in the chassis 14. Each of the bottom-portion through holes 19t extends in a thickness direction of the bottom portion 19b (the Z-axis direction) with a round opening. The attachment screw 41 is inserted in the chassis through hole 14s and the bottom-portion through hole 19t in this sequence from the rear side of the chassis 14. As a result, the bottom portion 19b of the heat dissipation member 19 is held by the chassis 14. As described earlier, the chassis through hole 14s has the oval shape with the major axis along the direction perpendicular to the light entrance surface 16b of the light guide plate 16 (i.e., the Y-axis direction) (see FIGS. 6 and 9). In this configuration, the bottom portion 19b (the heat dissipation member 19) which is fixed to the chassis 14 with the attachment screws 41 is movable by the length of the major axial of the bottom-portion through hole 19t. In other words, the heat dissipation member 19 is arranged so as to be slidable in the direction perpendicular to the light entrance surface 16b of the light guide plate 16 (i.e., the Y-axis direction) relative to the chassis 14. A minor axis dimension of the opening of the bottom-portion through hole 19t is smaller than a diameter of a head portion of the attachment screw 41. Therefore, the attachment screw 41 is less likely to further enter the bottom-portion through hole 19t.

As illustrated in FIG. 6, the contact portion 19c of the heat dissipation member 19 is a plate member parallel to the bottom portion 19b and the plate surface of the chassis 14. The contact portion 19c is a step-like portion that protrudes from an inner edge of the bottom portion 19b (a light guide plate 16 side) on a front side of the bottom portion 19b. A long-side direction, a short-side direction, and a thickness direction of the contact portion 19c are aligned with the X-axis direction, the Y-axis direction, and the Z-axis direction, respectively. The contact portion 19c includes an outer edge (the inner edge of the bottom portion 19b) which is an end portion of the contact portion 19c close to the screw attachment portion 21 (close to the sidewall 13b). The outer edge of the contact portion 19c is aligned with the light entrance surface 16b of the light guide plate with respect to a short-side direction of the light guide plate 16 (Y-axis direction). Level of the top of the contact portion 19c (i.e., a position in the Z-axis direction) is aligned with level of the top of the bottom plate portion 14a of the chassis 14. In this configuration, the contact portion 19c is in contact with the opposing surface 16c of the light guide plate 16 via the reflection sheet 20. The contact portion 19c is configured as a support member to support the end portion of the light guide plate 16 on the light entrance surface 16b side.

Figure 8:
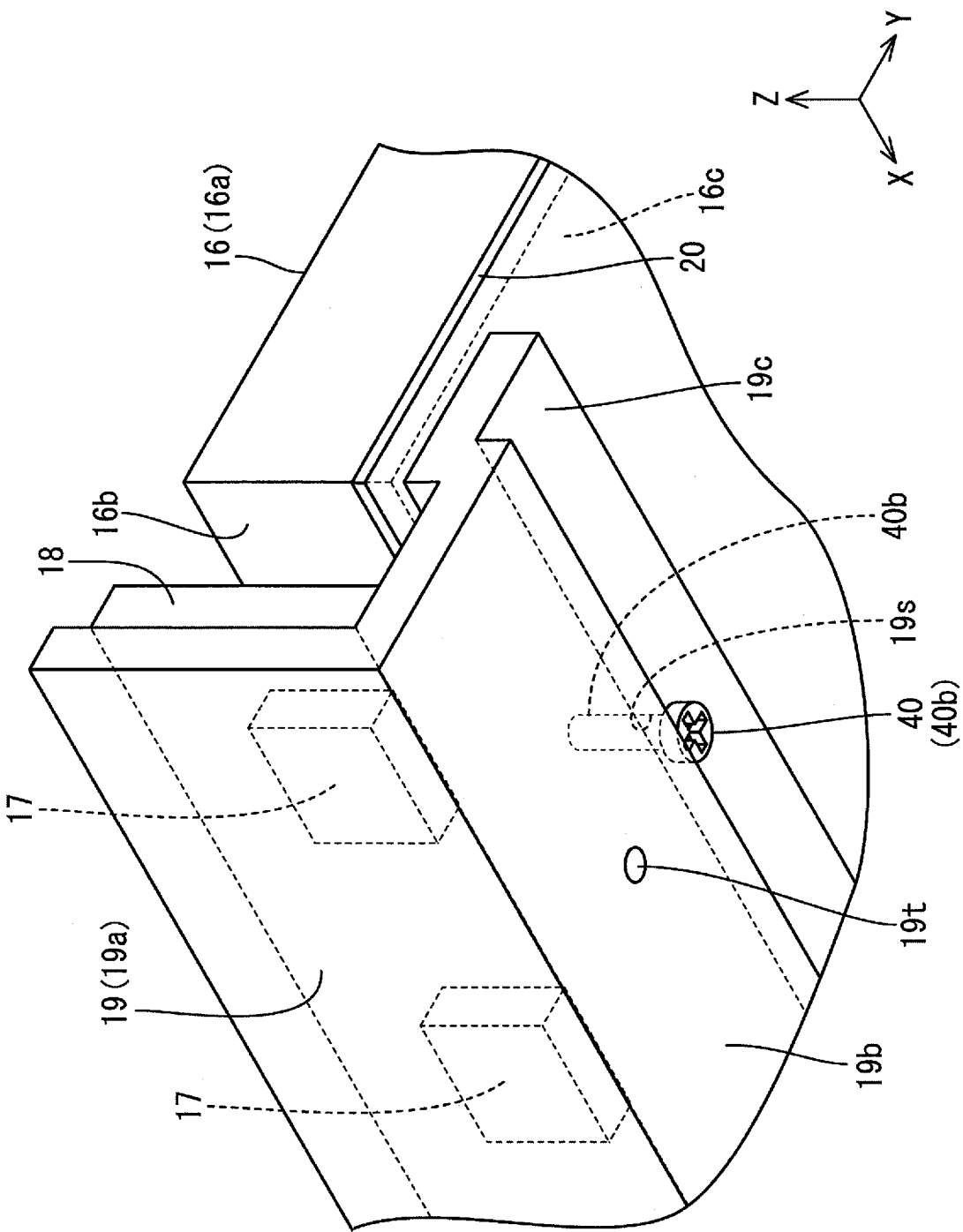
FIG. 8 is a magnified perspective view of an end of the LED unit LU in a longitudinal direction thereof and an end of the light guide plate 16 in a longitudinal direction thereof on the light entrance surface 16b side, viewed from a rear side.

The contact portion 19c includes the contact-portion through holes 19s at positions corresponding to the screw holes 16s formed in the opposing surface 16c of the light guide plate 16. Each of the contact-portion through holes 19s has a round opening and extends through the contact portion 19c in a thickness direction of the contact portion 19c (the Z-axis direction). As illustrated in FIG. 8, the fixing screw 40 is inserted in the contact-portion through hole 19s from a rear side of the contact portion 19c (the chassis 14 side). The fixing screw 40 includes a shaft portion 40b that is passed through the contact-portion through hole 19s. A tip portion of the shaft portion 40b is inserted in the screw hole 16s of the opposing surface 16c of the light guide plate 16. The fixing screw 40 includes a head portion 40a that is in surface-contact with a rear surface of the contact portion 19c (a surface facing the chassis 14). The head portion 40a is stopped at the surface so that the fixing screw 40 does not move further toward the light guide plate 16. The shaft portion 40b of the fixing screw 40 is arranged along the thickness direction of the light guide plate 16 (the thickness direction of the contact portion 19c or the Z-axis direction). An opening diameter of the contact-portion through hole 19s and an opening diameter of the screw hole 16s are substantially the same as an outer diameter of the fixing screw 40. With this configuration, the fixing screw 40 that is inserted through the contact-portion through hole 19s into the screw hole 16s is tightly fixed thereby and less likely to come off.

Figure 7:
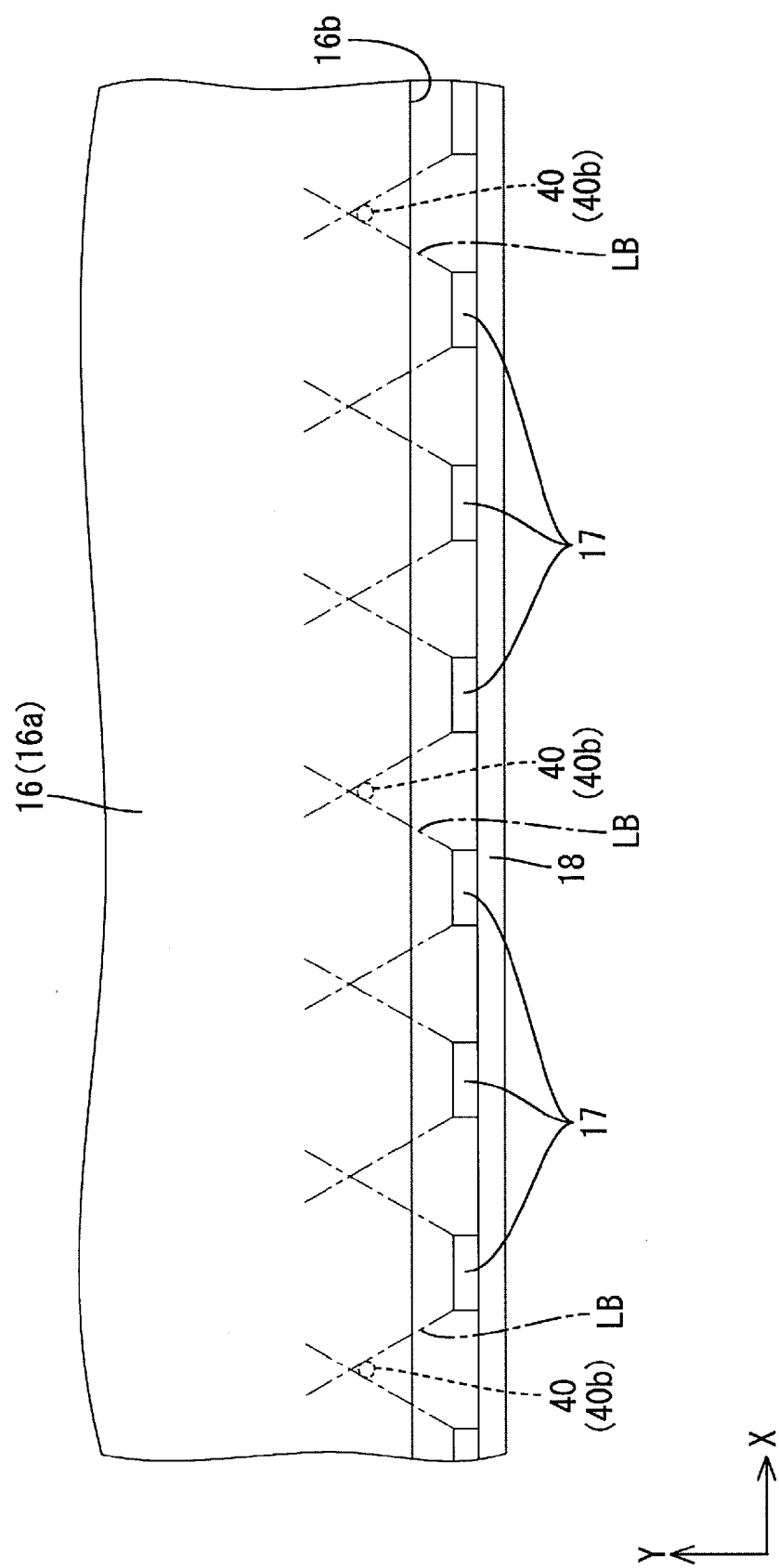
FIG. 7 is a plan view of an end portion of an LED unit LU and an end portion of a light guide plate 16 closer to a light entrance surface 16b viewed from a front side.

As illustrated in FIGS. 3 and 7, multiple fixing screws 40 are arranged apart from each other along the long-side direction of the light guide plate 16 (i.e., a longitudinal direction of the contact portion 19c or the X-axis direction). In other words, the fixing screws 40 are arranged along the long-side direction of the LED board 18 (the X-axis direction). Each fixing screw 40 is arranged at a portion of the contact portion 19c corresponding to a portion between the adjacent LEDs 17 on the LED board 18. More specifically, each of the contact-portion through holes 19s of the contact portion 19c is located in a position at an equal distance from the adjacent LEDs 17 on the LED board 18. The fixing screw 40 is passed through the contact portion 19c at the position equally apart from the adjacent LEDs 17 on the LED board 18. Accordingly, the fixing screws 40 are arranged such that a position of each fixing screw 40 corresponds to a middle of the adjacent LEDs 17 on the LED board 18 with respect to the longitudinal direction of the LED board 18 (the X-axis direction). Arrangement intervals of the fixing screws 40 may be altered as appropriate according to the intervals between the LEDs 17 or the configuration of the heat dissipation member 19. For example, in an area including the LEDs 17 that are arranged close to each other, an amount of heat generated as light is emitted from the LEDs 17 is large and a variation in size of each component due to the heat is large. In a portion of the contact portion 19c corresponding to such an area, the fixing screws 40 may be arranged at small intervals so that the contact portion 19c is tightly fixed to the light guide plate 16. In another area, the LEDs 17 may be arranged away from each other or a heat generation effect of the heat dissipation member 19 may be high. Therefore, in a portion of the contact portion 19c corresponding to such an area, the fixing screws 40 may be arranged at large intervals so that the number of the fixing screws 40 can be reduced.

As illustrated in FIG. 7, each LED 17 has light distribution LB that follows the Lambertian distribution as described earlier. The shaft portion 40b of the fixing screw 40 is inserted from the opposing surface 16c of the light guide plate 16 into a position or a depth such that the tip portion 40b1 does not overlap a light distribution LB area of the LED 17 (see FIGS. 6 and 7). In other words, the tip portion 40b1 of the shaft portion 40b is in a dark portion in the light entrance surface 16b of the light guide plate 16 between the adjacent LEDs 17. Therefore, rays of light that exit the LEDs 17 and enter the light guide plate 16 through the light entrance surface 16b are less likely to be blocked by the fixing screws 40.

Next, mounting of the fixing screws 40 during a production process of the liquid crystal display device 10 will be described. During the production process of the liquid crystal display device 10, components are mounted in sequence from the front surface side (an upper side in FIG. 4) of the liquid crystal display device 10. Specifically, the light guide plate 16 and the LED units LU are arranged inside the frame 13, and the chassis 14 is attached to the frame 13. The bottom portion 19b of each heat dissipation member 19 is screwed to the chassis 14 from the rear side of the chassis 14 and thus the LED units LU are fixed thereto. In the production process including the above steps, the fixing screws 40 are attached to the light guide plate 16 and the LED units LU before the light guide plate 16 and the LED units LU are arranged in the frame 13. Namely, the LED units LU are fixed to the light guide plate 16 in advance by fixing the contact portion 19c of the heat dissipation member 19 to the opposing surface 16c of the light guide plate 16 with the fixing screws 40. The light guide plate 16 that is connected to the LED units LU is arranged within the frame 13. Accordingly, the LED units LU and the light guide plate 16 that are fixed to each other with the fixing screws 40 is attached to the chassis 14.

As described earlier, since the contact portion 19c of the heat dissipation member 19 and the opposing surface 16c of the light guide plate 16 are tightly fixed to each other with the fixing screws 40, the stand-up portion 19a of the heat dissipation member 19 is located away from the light entrance surface 16b of the light guide plate 16 at a fixed distance. In other words, a distance between the light-emitting-surface of the LED 17 and the light entrance surface 16b of the light guide plate 16 is fixed. Therefore, even if thermal expansion and contraction occurs in each of the light guide plate 16, the LED boards 18, the light guide plate 16, and the heat dissipation members 19, the distance between the light-emitting surface of the LED 17 and the light entrance surface 16b of the light guide plate 16 is maintained constant.

As described earlier, in the liquid crystal display device 10 according to this embodiment, by fixing the contact portion 19c of the heat dissipation member 19 to the opposing surface 16c of the light guide plate 16, the stand-up portion 19a and the LED board 18 are fixed relative to the light guide plate 16. Therefore, the distance between the LEDs 17 and the light entrance surface 16b is restricted. Even when components, such as the light guide plate 16 and the heat dissipation members 19, thermally expand, the distance between the LEDs 17 and the light entrance surface 16b is maintained. Therefore, the distance between the LEDs 17 and the light entrance surface 16b before the thermal expansion and the distance therebetween after the thermal expansion remain constant. With this configuration, even if the component such as the heat dissipation member 19 expands, light-entering efficiency of rays of light exiting the LEDs 17 and entering through the light entrance surface 16b does not decrease or is less likely to decrease. Namely, proper optical properties can be maintained.

In this configuration, each module includes the liquid crystal display device 10 according to this embodiment. Therefore, the distance between the LEDs and the light entrance surface of each module is maintained constant. With this configuration, production unevenness in the modules does not occur or is less likely to occur.

In the liquid crystal display device 10 according to this embodiment, the LED holding portion 14b of the chassis 14 includes the chassis through holes 14s in which the respective attachment screws 41 are fitted to fix the bottom portion 19b to the chassis 14. Each of the chassis through holes 14s has the oval shape with the major axis along the direction perpendicular to the light entrance surface 16b of the light guide plate 16 (i.e., the Y-axis direction). Therefore, the bottom portion 19b arranged on the bottom plate (LED holding portion 14b) is slidable in the direction perpendicular to the light entrance surface 16b of the light guide plate 16 (the Y-axis direction). If the component such as the heat dissipation member 19 expands in the direction perpendicular to the light entrance surface 16b (the Y-axis direction), the heat dissipation member 19 slides in the direction perpendicular to the light entrance surface 16b (the Y-axis direction) by a length corresponding to the expanded amount. With this configuration, a stress exerted on the heat dissipation member 19 is released and thus warping due to the stress does not occur or is less likely to occur in each component. Therefore, the distance between the LEDs 17 and the light entrance surface 16b is less likely to change.

In the liquid crystal display device 10 according to this embodiment, the LED board 18 has a rectangular shape and the LEDs 17 are arranged along the long-side direction of the LED board 18 (the X-axis direction). The fixing screws 40 are arranged along the long-side direction of the LED board 18 (the X-axis direction). In this configuration, the heat dissipation member 19 is fixed to the light guide plate 16 with the fixing screws 40. Even if the contact portion 19c of the heat dissipation member 19 warps along the long-side direction of the LED board 18 (the X-axis direction), the distance between the LEDs 17 and the light entrance surface 16b does not change or is less likely to change. Therefore, the distance between the LEDs 17 and the light entrance surface 16b is effectively maintained.

In the liquid crystal display device 10 according to this embodiment, each of the fixing screws 40 is arranged in the contact portion 19c at the portion corresponding to the portion between the adjacent LEDs 17 on the LED board 18. In this configuration, since each fixing screw 40 is in the portion of the contact portion 19c corresponding to the portion between the adjacent LEDs 17 on the LED board 18, the contact portion 19c is fixed with the fixing screws 40 while a substantially even force is applied to each portion thereof along the longitudinal direction of the LED board 18 (the longitudinal direction). Thus, the distance between the LED 17 and the light entrance surface 16b is maintained constant with appropriate accuracy.

In the liquid crystal display device 10 according to this embodiment, each of the fixing screws 40 is passed through the portion of the contact portion 19c at the same distance from the adjacent LEDs 17 on the LED board 18. In this configuration, the contact portion 19c is fixed with the fixing screws 40 while a force is evenly applied to each portion thereof between the adjacent LEDs 17 without biasing toward one of the adjacent LEDs 17. Thus, the distance between the LED 17 and the light entrance surface 16b is maintained constant with appropriate accuracy.

In the liquid crystal display device 10 according to this embodiment, each LED 17 has the light distribution LB that follows the Lambertian distribution. The tip portion of the fixing screw 40 may be inserted from the opposing surface 16c into a position and a depth not overlapping the light distribution LB area in which light exiting the LEDs 17 and entering through the light entrance surface 16b is distributed. In this configuration, light that exits the LEDs 17 and enters through the light entrance surface 16b is not blocked by the fixing screws 40. Therefore, uneven brightness does not occur or is less likely to occur at the light exit surface 16a of the light guide plate 16 due to blocking of light by the fixing screws 40.

Second Embodiment

The third embodiment will be described with reference to the drawings. The third embodiment includes fixing screws 240. The number and arrangement of fixing screws 240 differs from those in the first embodiment. The other structures are the same as the first embodiment, and thus configurations, functions, and effects similar to the first embodiment will not be described. In FIG. 9, members and portions indicated by numerals including the reference numerals in FIG. 7 with 100 added thereto have the same configurations as in the first embodiment.

Figure 10:
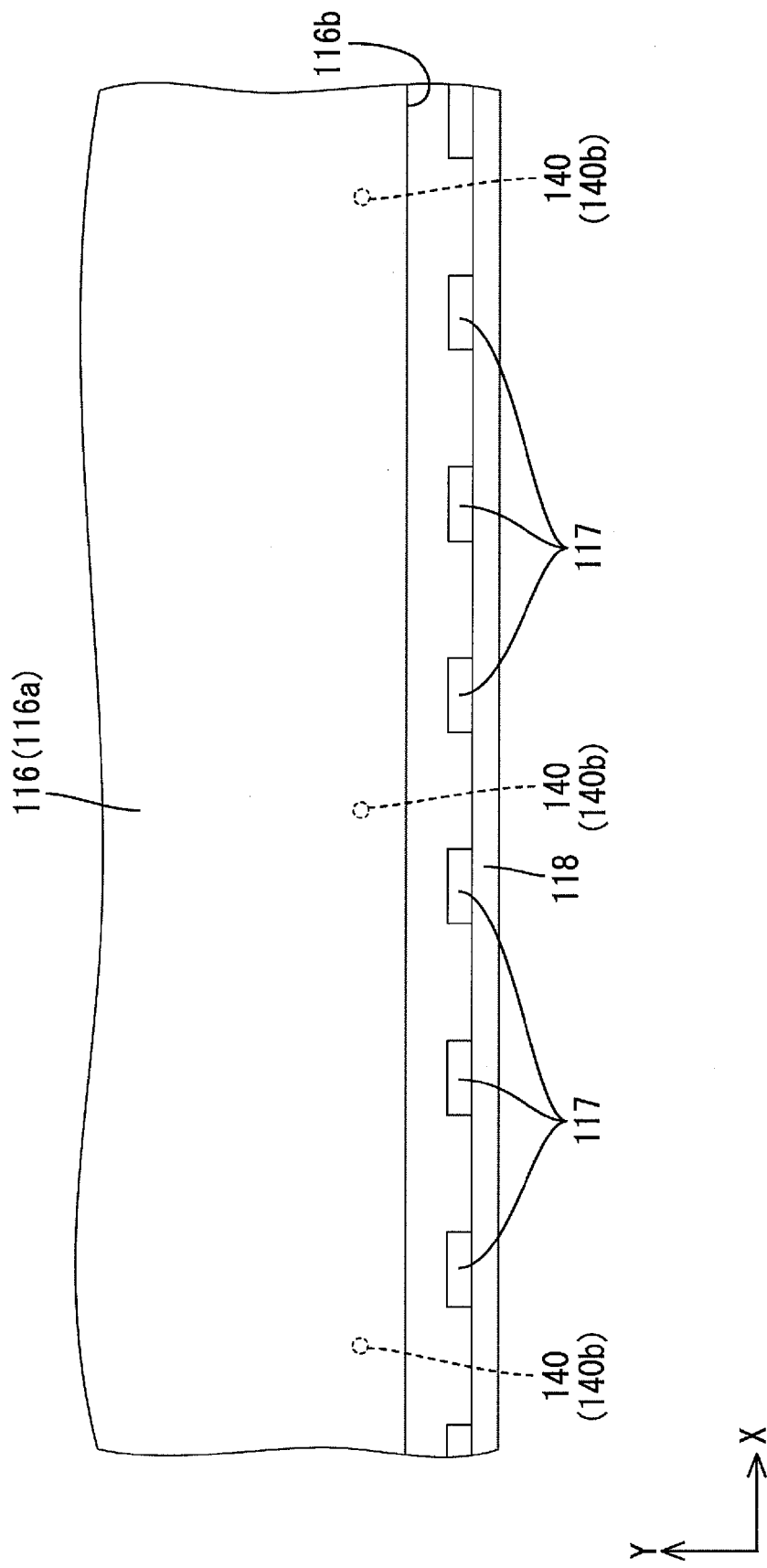
FIG. 10 is a plan view of an LED unit LU and an end portion of a light guide plate 116 closer to a light entrance surface 116b viewed from a front side according to a second embodiment.

In a liquid crystal display device according to the second embodiment, fixing screws 140 have transparency. Materials having transparency may be selected from polymethyl methacrylate resin, polystyrene resin, and methyl methacrylate-styrene copolymer resin, which are materials used for a light guide plate 116. As illustrated in FIG. 10, the fixing screws 140 are passed through a contact portion 119c. Each fixing screw 140 is located at a point that is offset from a point that is at an equal distance from the respective LEDs 117 that are adjacent to each other toward one of the adjacent LEDs 117. In the configuration including the transparent fixing screws 140, even if rays of light from the LEDs 117 reach the fixing screws 140 (i.e., even if a tip of a shaft portion 140b of the fixing screw 140 is in an area and a depth overlapping the light distribution LB area in which light that exits the LEDs 117 and enters through the light entrance surface 116b is distributed), the rays of light are less likely to be blocked by the fixing screws 140. Therefore, the fixing screws 140 can be arranged close to the LEDs 117 as described above. In comparison to a case in which the fixing screw 140 is passed through a portion of the contact portion equally apart from the adjacent LEDs 117 on the LED board 118, each fixing screw 140 in this configuration can be placed closer to the LED 117. Therefore, the distance between the LEDs 117 and the light entrance surface 116b is fixed at a position close to the LED 117. Namely, the distance between the LEDs 117 and the light entrance surface 116b is fixed with appropriate accuracy.

Third Embodiment

Figure 11:
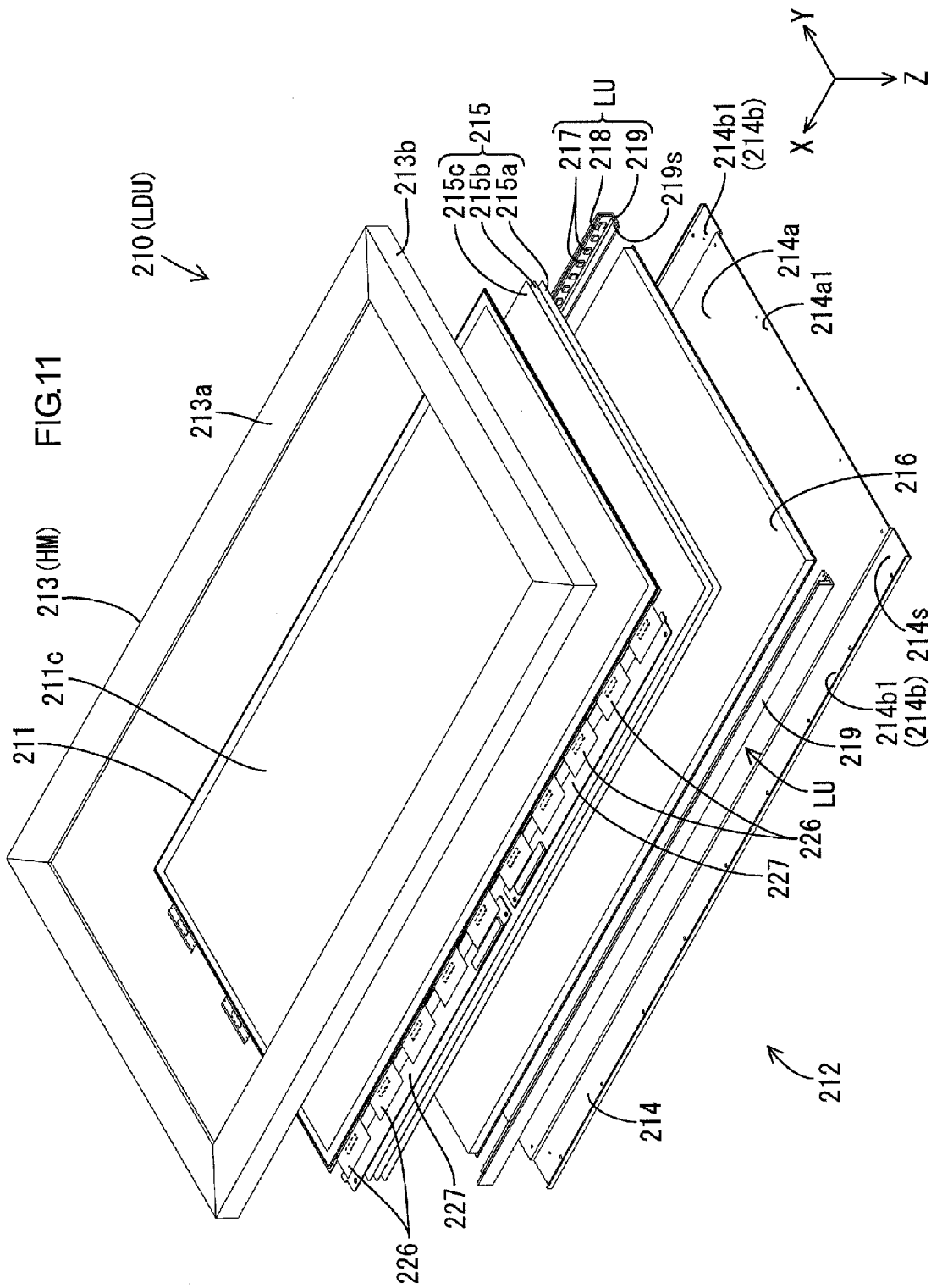
FIG. 11 is an exploded perspective view of a general configuration of a liquid crystal display device 210 and a liquid crystal display unit LDU according to a third embodiment.

The third embodiment will be described with reference to the drawings. The number and arrangement in the third embodiment differ from those in the first embodiment. The other structures are the same as the first embodiment, and thus configurations, functions, and effects similar to the first embodiment will not be described. In FIG. 11, members and portions indicated by numerals including the reference numerals in FIG. 3 with 200 added thereto have the same configurations as in the first embodiment.

Figure 12:
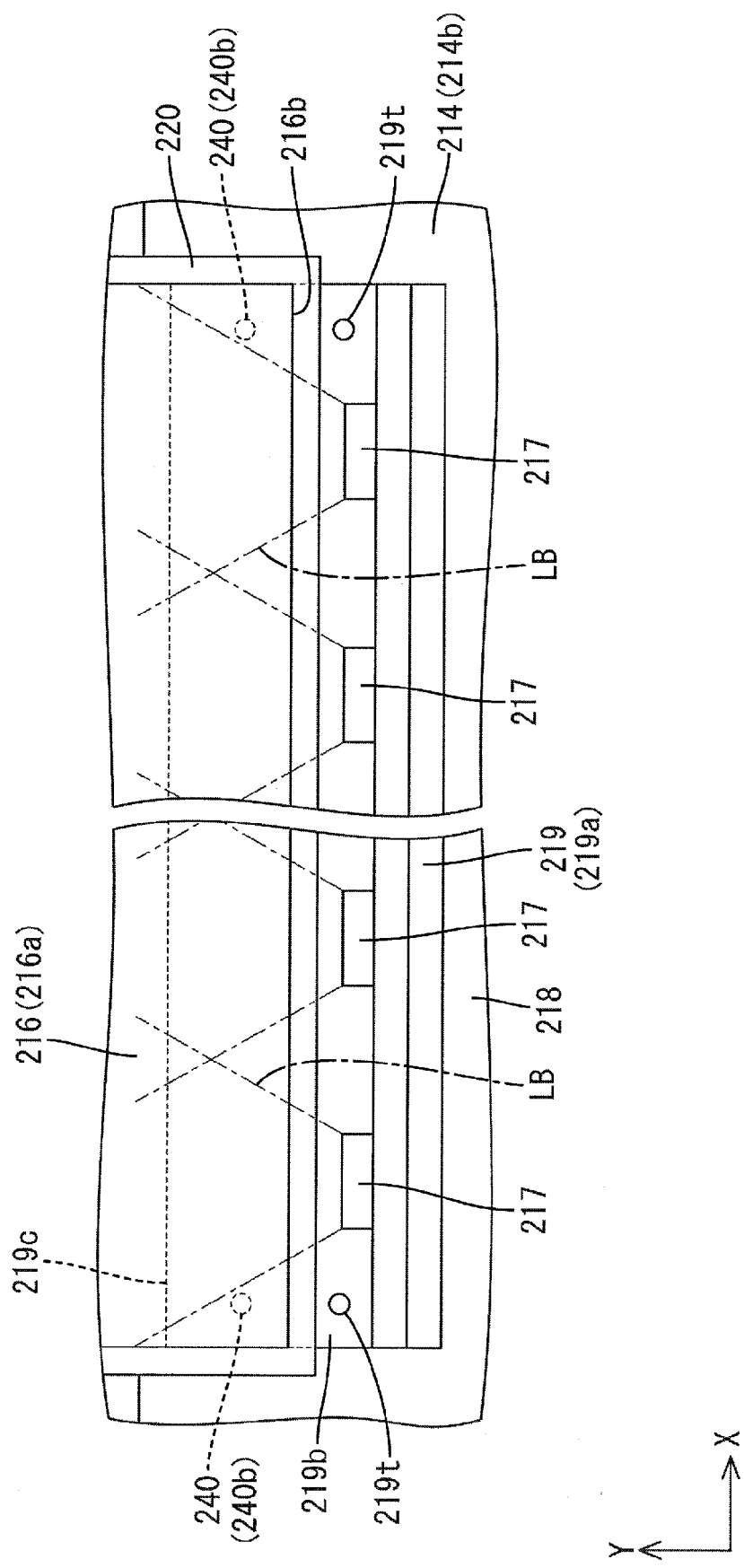
FIG. 12 is a magnified plan view of an end of an LED unit LU in a longitudinal direction thereof and an end of a light guide plate 216 in a longitudinal direction thereof on a light entrance surface 216b side.

As illustrated in FIG. 11, in a liquid crystal display device 210 according to the third embodiment, two fixing screws 240, 240 are passed through end portions of a long dimension of a contact portion 219c included in a heat dissipation member 219 (i.e., end portions in the X-axis direction), respectively. With this configuration in which the fixing screws 240 are arranged only in the end portions of the contact portion 219c, the number of fixing screws 240 can be reduced. Therefore, the production process can be simplified and the component cost is reduced. Further, as illustrated in FIG. 12, each fixing screw 240 is passed through an opposing surface 216c of a light guide plate 16 into a portion and a depth such that a tip portion of a shaft portion 240b of the fixing screw 240 does not overlap a light distribution LB area of each LED 217. Namely, light emitted from the LEDs 217 is less likely to be blocked by the fixing screws 240. Therefore, uneven brightness does not occur or is less likely to occur at the light exit surface 216a of a light guide plate 216 due to blocking of light by the fixing screws 240.

Modifications of the above embodiments will be listed below.

(1) In the above embodiments, the configuration in which the fixing screws are arranged at intervals along the longitudinal direction of the contact portion and the configuration in which the fixing screw is arranged at each end portion of the long dimension of the contact portion are described. However, the number and arrangement of the fixing screws are not limited to the above embodiments. For example, the fixing screws may be arranged between the adjacent LEDs along the short-side direction of the LED board.

(2) In each of the above embodiments, the bottom portion of the heat dissipation member is arranged on the LED holding portion of the chassis so as to slidable in the direction perpendicular to the light entrance surface. However, the bottom portion of the heat dissipation member may be fixed to the chassis. Even in such a case, the distance between the LEDs and the light entrance surface is maintained with the fixing screws. Therefore, even when the component such as the light guide plate thermally expands or contracts, the distance between the LEDs and the light entrance surface is less likely to change.

(3) In each of the above embodiments, the light distribution of each LED follows the Lambertian distribution. However, the LED may have light distribution not following the Lambertian distribution.

(4) In each of the above embodiments, the LED units LU are arranged so as to sandwich the light guide plate from the long sides of the light guide plate. However, the LED unit may be arranged on one side of the light guide plate. Furthermore, the LED units may be arranged on three or all sides of the light guide plate. In such cases, each LED unit may fix to the light guide plate with fixing screws.

(5) The configuration, arrangement, number, and shape of the fixing screws can be altered from those in the above embodiments as appropriate.

(6) In each of the above embodiments, the liquid crystal display device does not include a cabinet. However, the aspect of this invention can be applied to a liquid crystal display device including a cabinet.

(7) In each of the above embodiments, the liquid crystal display device including the liquid crystal panel as the display panel is used. However, the aspect of this invention can be applied to display devices including other types of display panels.

The embodiments have been described in detail. However, the above embodiments are only some examples and do not limit the scope of the claimed invention. The technical scope of the claimed invention includes various modifications of the above embodiments.

The technical elements described in this specification and the drawings may be used independently or in combination to achieve the technical benefits. The combinations are not limited to those in claims. With the technologies described in this specification and the drawings, multiple objectives may be accomplished at the same time. However, the technical benefits can be achieved by accomplishing even only one of the objectives.

EXPLANATION OF SYMBOLS

TV: television device, LDU, liquid crystal display unit, PWB: power board, MB: main board, CTB: control board, CV: cover, ST: stand, LU: LED unit, 10, 210: liquid crystal display device, 11, 211: liquid crystal panel, 12, 212: backlight device, 13, 213: frame, 14, 214: chassis, 14s, 114s: chassis through hole, 15, 215: optical member, 16, 116, 216: light guide plate, 16b, 116b, 216b: light entrance surface, 16c: opposing surface, 17, 117, 217: LED, 18, 118, 218: LED board, 19, 119, 219: heat dissipation member, 19a, 119a, 219a: stand-up portion, 19b, 119b, 219b: bottom portion, 19c, 119c, 219c:

contact portion, 16s: screw hole, 20: reflection sheet, 40, 140, 240: fixing screw, 41: attachment screw.

The invention claimed is:

1. A display device comprising:
a light source;
a display panel configured to provide a display using light from the light source;
a light guide plate including one plate surface as a light exit surface, another plate surface as an opposing surface, and at least a side-surface as a light entrance surface, the light guide plate being arranged such that the light exit surface faces a surface of the display panel opposite from a display surface thereof and the light entrance surface faces the light source, the light guide plate being configured to direct light from the light source toward the display panel;
a chassis including at least a bottom plate and arranged on an opposite side of the light guide plate from the display panel;
a frame arranged on the display surface side of the display panel and holding the display panel, the light source, and the light guide plate between the frame and the chassis;
a light source board having a surface on which the light source is mounted and arranged parallel to the light entrance surface;
a heat dissipation member having a heat dissipation property and including a contact portion, a bottom portion, and a stand-up portion, the contact portion being in contact with an end portion of the opposing surface close to the light entrance surface, the bottom portion being arranged on the bottom plate along the bottom plate, the stand-up portion projecting from the bottom portion toward a display panel side and including a surface on which the light source board is mounted; and
a fixing screw passed through the contact portion and including a tip portion fixed in the opposing surface such that the stand-up portion and the light source board are fixed relative to the light guide plate; wherein
the light source board has a rectangular shape,
the light source includes a plurality of light sources arranged along a longitudinal direction of the light source board,
the fixing screw includes a plurality of fixing screws arranged along the longitudinal direction of the light source board, and
each of the fixing screws is in a portion of the contact portion corresponding to a position between adjacent light sources on the light source board.

2. The display device according to claim 1, wherein the bottom portion is arranged on the bottom plate so as to be slidable in a direction perpendicular to the light entrance surface.

3. The display device according to claim 2, wherein one of the bottom portion and the bottom plate includes a through hole through which an attachment member to attach the bottom portion to the chassis is to be passed, the through hole having an oval shape with a major axis along the direction perpendicular to the light entrance surface.

4. The display device according to claim 1, wherein the fixing screw is passed through a portion of the contact portion at an equal distance from the respective light sources that are adjacent to each other on the light source board.

5. The display device according to claim 1, wherein
the contact portion has a rectangular shape, and
each of the fixing screws being passed through an end portion of a long dimension of the contact portion.

6. The display device according to claim 1, wherein the display panel is a liquid crystal display panel including liquid crystals.

7. A television device comprising the display device according to claim 1.

8. A display device comprising:
a light source;
a display panel configured to provide a display using light from the light source;
a light guide plate including one plate surface as a light exit surface, another plate surface as an opposing surface, and at least a side-surface as a light entrance surface, the light guide plate being arranged such that the light exit surface faces a surface of the display panel opposite from a display surface thereof and the light entrance surface faces the light source, the light guide plate being configured to direct light from the light source toward the display panel;
a chassis including at least a bottom plate and arranged on an opposite side of the light guide plate from the display panel;
a frame arranged on the display surface side of the display panel and holding the display panel, the light source, and the light guide plate between the frame and the chassis;
a light source board having a surface on which the light source is mounted and arranged parallel to the light entrance surface;
a heat dissipation member having a heat dissipation property and including a contact portion, a bottom portion, and a stand-up portion, the contact portion being in contact with an end portion of the opposing surface close to the light entrance surface, the bottom portion being arranged on the bottom plate along the bottom plate, the stand-up portion projecting from the bottom portion toward a display panel side and including a surface on which the light source board is mounted; and
a fixing screw passed through the contact portion and including a tip portion fixed in the opposing surface such that the stand-up portion and the light source board are fixed relative to the light guide plate; wherein
the light source board has a rectangular shape,
the light source includes a plurality of light sources arranged along a longitudinal direction of the light source board,
the light source has a light distribution following a Lambertian distribution,
the fixing screw includes a plurality of fixing screws arranged along the longitudinal direction of the light source board, and
the tip portion of the fixing screw is located in an area and a depth inward from the opposing surface, the area and the depth not overlapping a light distribution area in which light exiting the light source and entering through the light entrance surface is distributed.

9. The display device according to claim 8, wherein the bottom portion is arranged on the bottom plate so as to be slidable in a direction perpendicular to the light entrance surface.

10. The display device according to claim 9, wherein one of the bottom portion and the bottom plate includes a through hole through which an attachment member to attach the bottom portion to the chassis is to be passed, the through hole having an oval shape with a major axis along the direction perpendicular to the light entrance surface.

11. The display device according to claim 8, wherein
the contact portion has a rectangular shape, and
each of the fixing screws being passed through an end portion of a long dimension of the contact portion.

12. The display device according to claim 8, wherein the display panel is a liquid crystal display panel including liquid crystals.

13. A television device comprising the display device according to claim 8.

14. A display device comprising:
a light source;
a display panel configured to provide a display using light from the light source;
a light guide plate including one plate surface as a light exit surface, another plate surface as an opposing surface, and at least a side-surface as a light entrance surface, the light guide plate being arranged such that the light exit surface faces a surface of the display panel opposite from a display surface thereof and the light entrance surface faces the light source, the light guide plate being configured to direct light from the light source toward the display panel;
a chassis including at least a bottom plate and arranged on an opposite side of the light guide plate from the display panel;
a frame arranged on the display surface side of the display panel and holding the display panel, the light source, and the light guide plate between the frame and the chassis;
a light source board having a surface on which the light source is mounted and arranged parallel to the light entrance surface;
a heat dissipation member having a heat dissipation property and including a contact portion, a bottom portion, and a stand-up portion, the contact portion being in contact with an end portion of the opposing surface close to the light entrance surface, the bottom portion being arranged on the bottom plate along the bottom plate, the stand-up portion projecting from the bottom portion toward a display panel side and including a surface on which the light source board is mounted; and
a fixing screw passed through the contact portion and including a tip portion fixed in the opposing surface such that the stand-up portion and the light source board are fixed relative to the light guide plate; wherein
the light source board has a rectangular shape,
the light source includes a plurality of light sources arranged along a longitudinal direction of the light source board,
the fixing screw includes a plurality of fixing screws arranged along the longitudinal direction of the light source board, and
each of the fixing screws is made of material having a transparency and passed through the contact portion at a point that is offset from a point that is at an equal distance from respective light sources that are adjacent to each other on the light source board toward one of the adjacent light sources.

15. The display device according to claim 14, wherein the bottom portion is arranged on the bottom plate so as to be slidable in a direction perpendicular to the light entrance surface.

16. The display device according to claim 15, wherein one of the bottom portion and the bottom plate includes a through hole through which an attachment member to attach the bottom portion to the chassis is to be passed, the through hole having an oval shape with a major axis along the direction perpendicular to the light entrance surface.

17. The display device according to claim 14, wherein
the contact portion has a rectangular shape, and
each of the fixing screws being passed through an end portion of a long dimension of the contact portion.

18. The display device according to claim 14, wherein the display panel is a liquid crystal display panel including liquid crystals.

19. A television device comprising the display device according to claim 14.

* * * * *